Jan. 29, 1935.　　　D. BELCHER　　　1,989,471
BAG CLOSING AND SEALING MACHINE
Filed April 2, 1932　　　15 Sheets-Sheet 2

Inventor
DANIEL BELCHER
By Paul, Paul & Moore
ATTORNEYS

Jan. 29, 1935.    D. BELCHER    1,989,471
BAG CLOSING AND SEALING MACHINE
Filed April 2, 1932    15 Sheets-Sheet 3
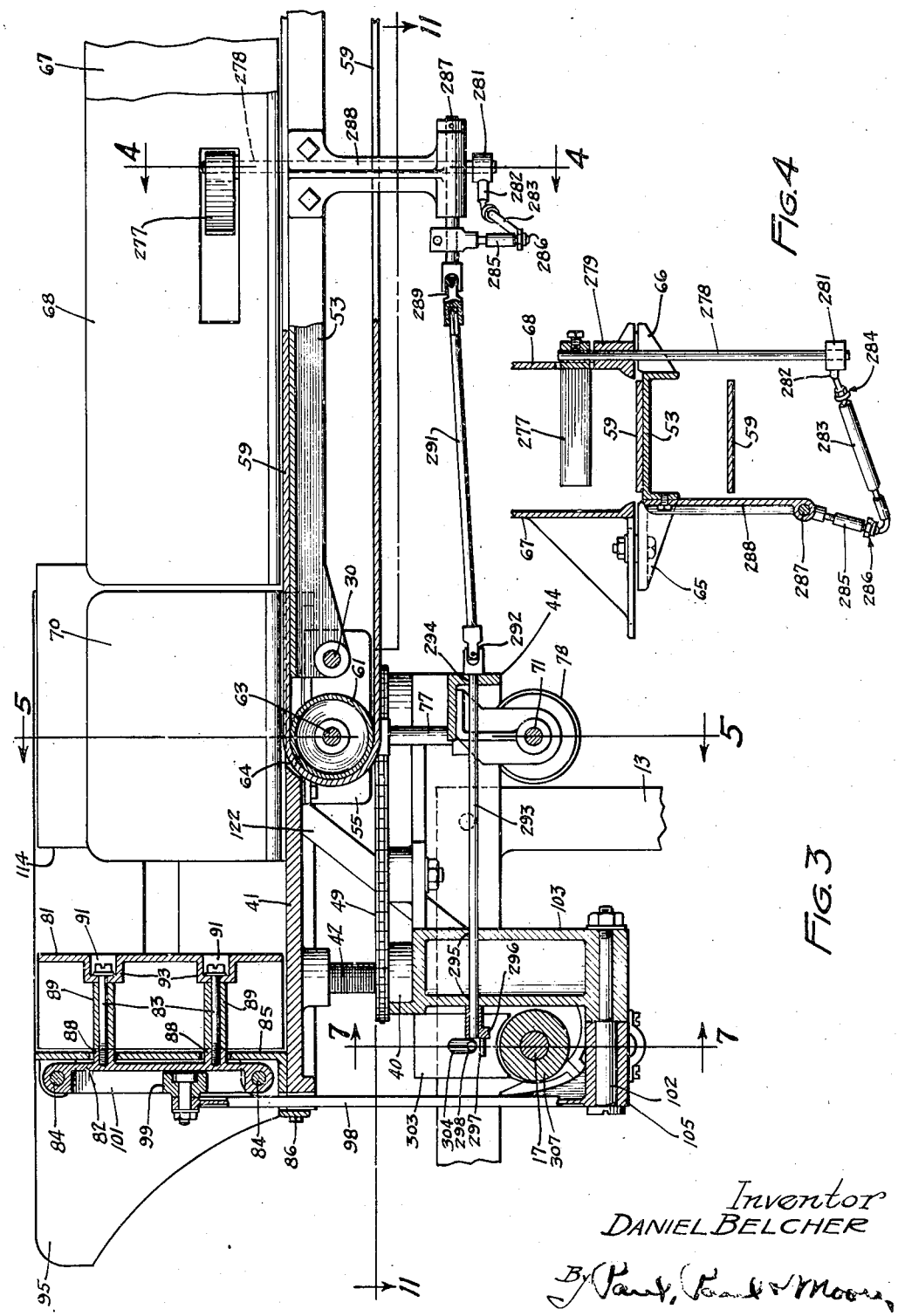
Inventor
DANIEL BELCHER
By Paul, Paul & Moore
ATTORNEYS

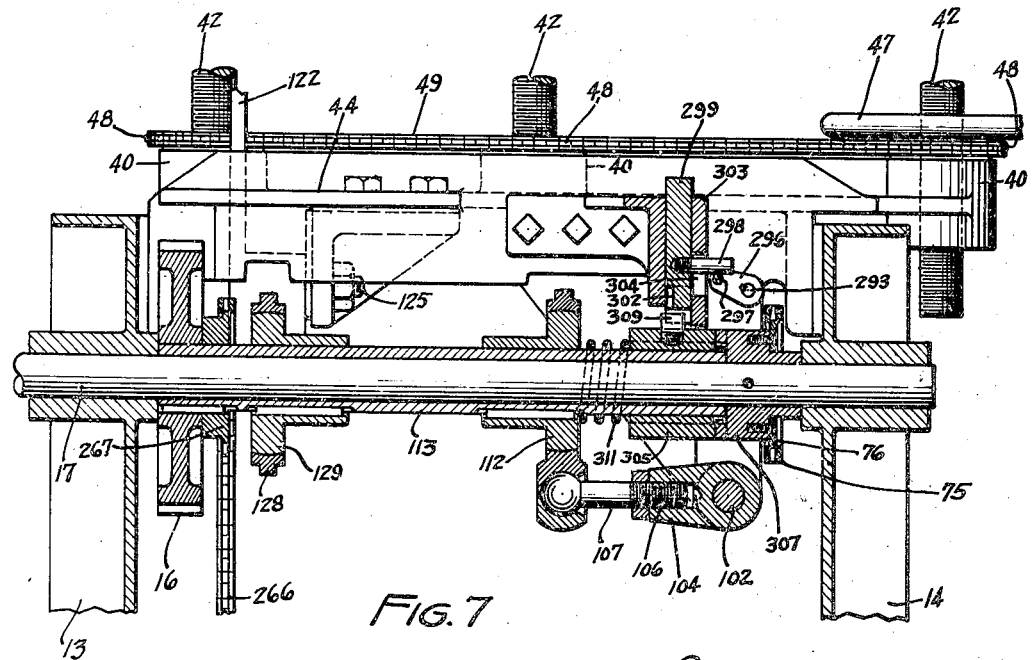
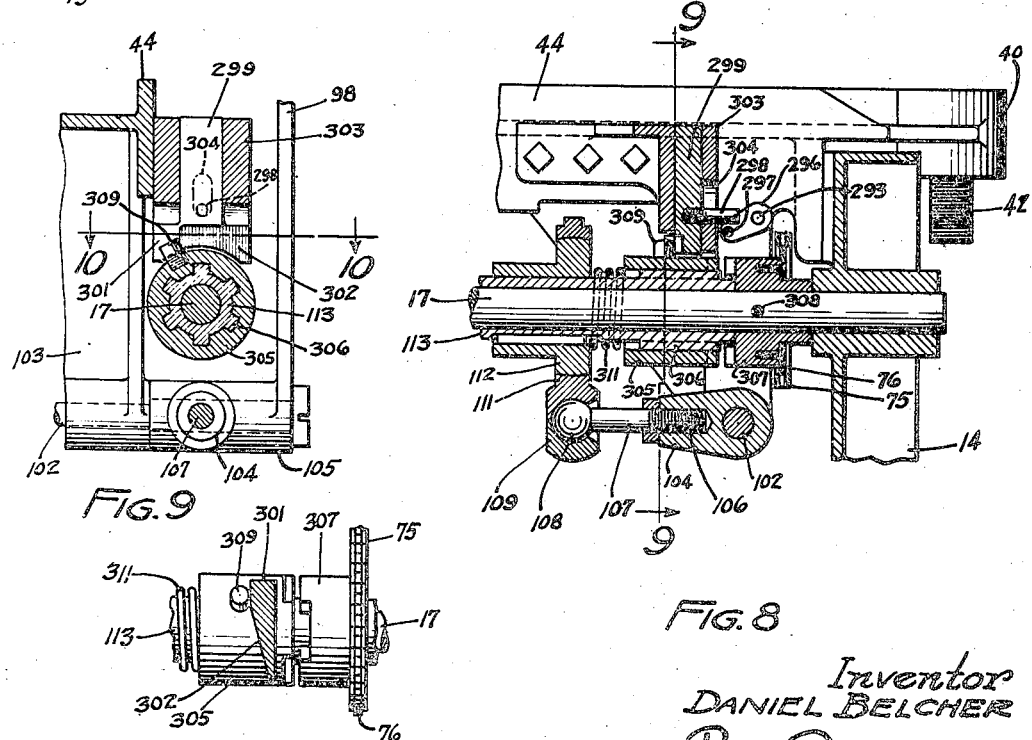

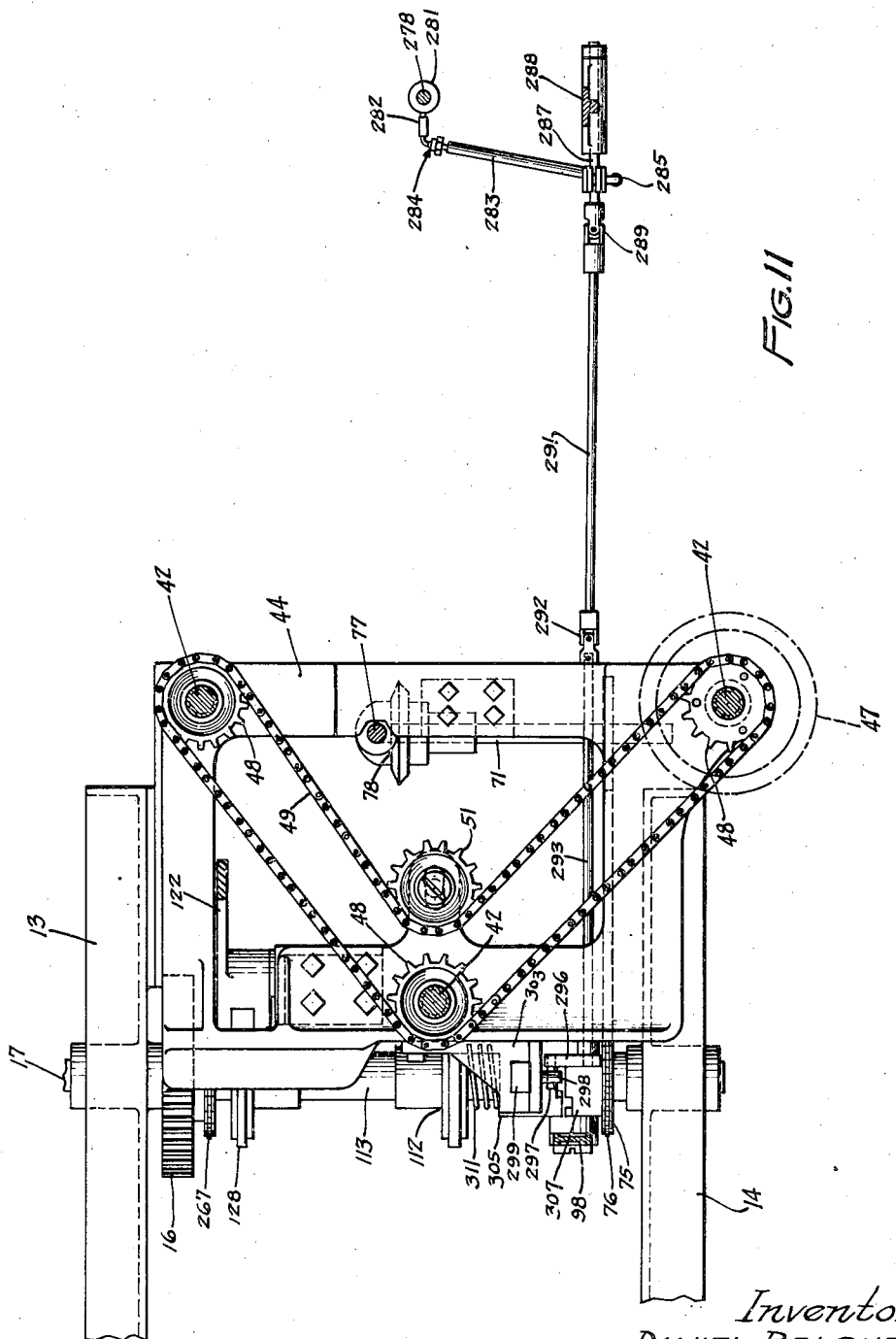
Fig.11
ATTORNEYS

Jan. 29, 1935. D. BELCHER 1,989,471
BAG CLOSING AND SEALING MACHINE
Filed April 2, 1932 15 Sheets-Sheet 10

Inventor
DANIEL BELCHER
ATTORNEYS

Jan. 29, 1935.  D. BELCHER  1,989,471
BAG CLOSING AND SEALING MACHINE
Filed April 2, 1932   15 Sheets-Sheet 12
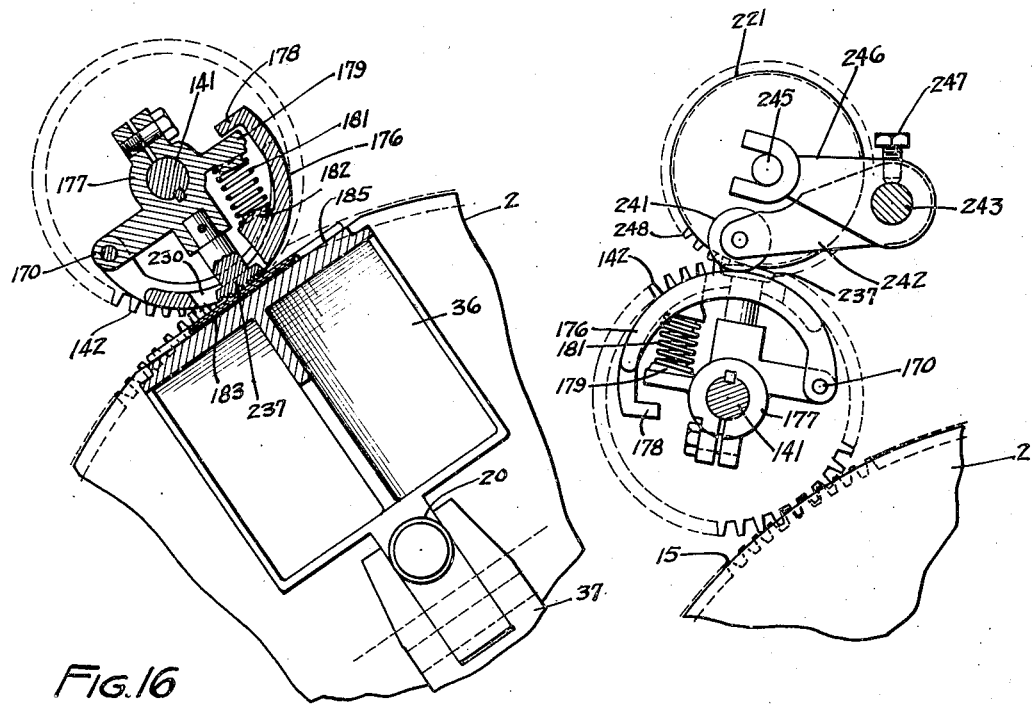
Fig. 16
Fig. 17
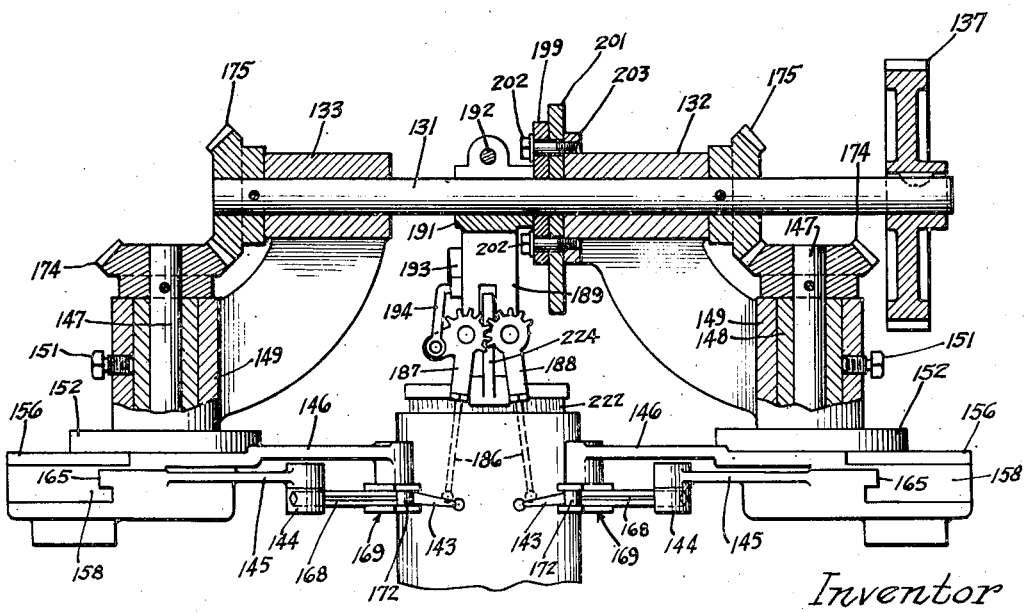
Fig. 18
Inventor
DANIEL BELCHER
By Paul, Paul & Moore
ATTORNEYS Jan. 29, 1935.  D. BELCHER  1,989,471
BAG CLOSING AND SEALING MACHINE
Filed April 2, 1932   15 Sheets-Sheet 13
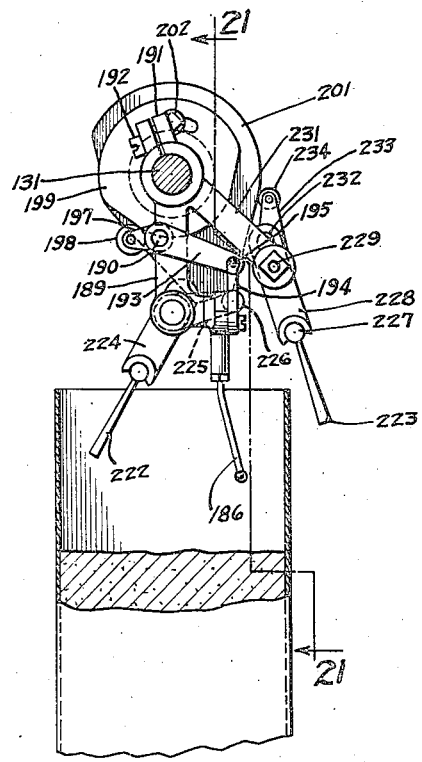
FIG. 20
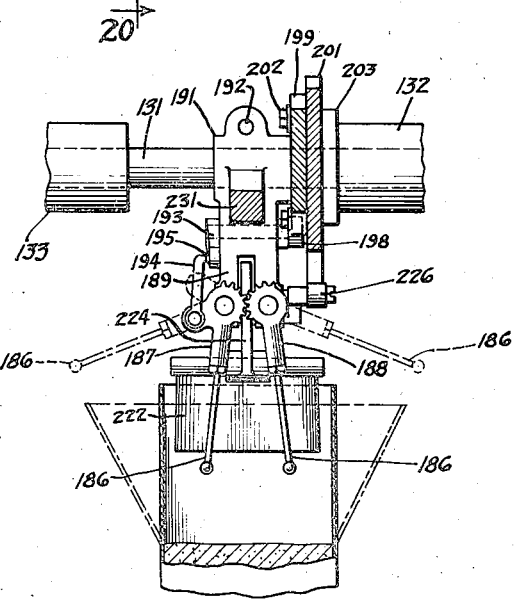
FIG. 19
FIG. 21
Inventor
DANIEL BELCHER
By Paul, Paul & Moore
ATTORNEYS

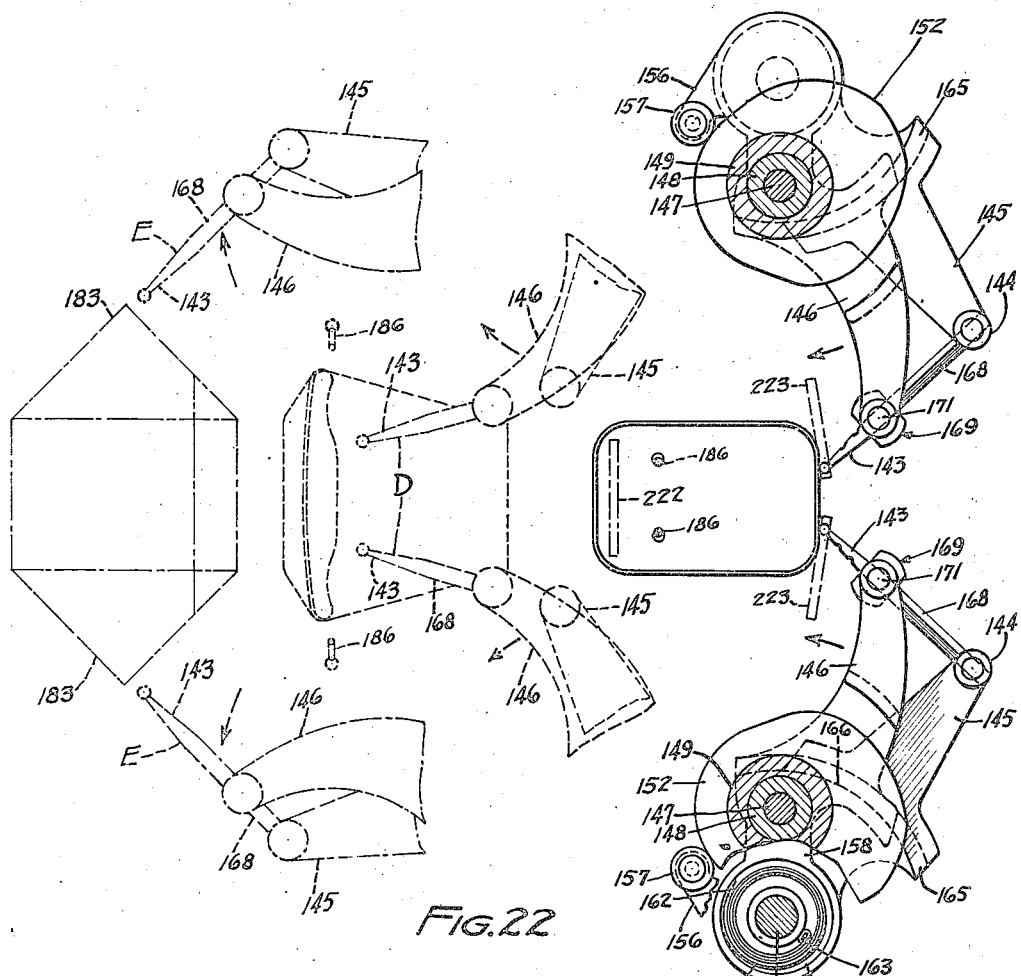
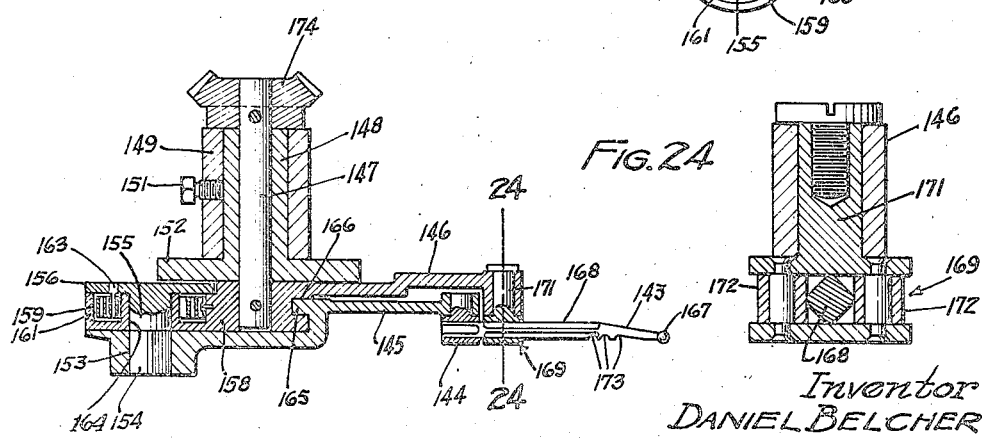

Jan. 29, 1935. D. BELCHER 1,989,471
BAG CLOSING AND SEALING MACHINE
Filed April 2, 1932 15 Sheets-Sheet 15

Inventor
DANIEL BELCHER
By Paul, Paul & Moore
ATTORNEYS

Patented Jan. 29, 1935

1,989,471

UNITED STATES PATENT OFFICE 1,989,471

BAG CLOSING AND SEALING MACHINE

Daniel Belcher, Minneapolis, Minn., assignor to Bemis Bro. Bag Co., Minneapolis, Minn., a corporation of Missouri Application April 2, 1932, Serial No. 602,735

28 Claims. (Cl. 93—6)

This invention relates to new and useful improvements in bag closing and sealing machines, and particularly to such apparatus adapted for use to automatically close and seal the open tops of filled paper bags or containers having flexible walls.

An object of the invention is to provide an improved bag closing and sealing machine comprising a plurality of compartments each adapted to receive a filled bag or container, and having means for squaring the upper portion of the bag body substantially at a location coincident with the level of the material therein, after which the walls of the bag mouth are folded inwardly over the top of the bag body, one over the other, and suitably sealed to provide substantially a leak-proof closure.

A further object is to provide a bag closing and sealing machine comprising a rotatable member provided with a plurality of compartments, and having means for automatically delivering the filled bags or containers into said compartments whereby the bags are successively carried through the machine and the open tops thereof closed and sealed.

A further object is to provide in combination with a bag closing and sealing machine, a feeding mechanism comprising a conveyer to which the filled bags to be sealed are delivered from a suitable source, and said feeding mechanism having means at the discharge end thereof operating in timed relation to the bag closing machine and adapted to successively and automatically feed the bags into the bag holding compartments of the machine, wherein they are supported while the open tops thereof are being closed and sealed.

Other objects of the invention reside in the particular arrangement and construction of the walls of the compartments into which the filled bags are fed from the feeding conveyer, whereby the bags are supported in substantially an upright position until after the walls of the bag mouth have been partially folded, thereby preventing the material from relatively shifting its position in the bag and making it possible to close the open tops of bags containing granular material such, for example, as corn meal, sugar, and various other products which have a tendency to seek a level, when the bag is tilted to an inclined position before being closed and sealed; in the means provided for inwardly pressing the upper portion of each bag body to square the top thereof prior to the operation of folding the walls of the bag top into closing relation; in the construction of the means provided for folding the bag top walls whereby the walls of the bag tops will be accurately folded so that the bags, when closed and sealed, will be uniform in appearance; in the novel means employed for applying gum to certain portions of the bag top walls; in the means provided for automatically feeding the filled bags into the compartments of the machine; in the means provided in connection with the feeding conveyer whereby the operation of the bag closing and sealing machine will be automatically controlled by the travel of the filled unclosed bags or containers over said feeding means; and, in the general construction and arrangement of the various parts and mechanisms, whereby a machine is provided which is adapted for automatic operation to close and seal the open tops of filled bags in such a manner that the sealed bags, when discharged from the machine, will be alike and uniform in appearance.

A further object is to provide an improved bag closing and sealing machine of the general type and character disclosed in my pending application, Serial No. 451,702, filed May 12, 1930.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 3 is an enlarged detail sectional view on the line 3—3 of Figure 2, showing the discharge end of the feeding means;

Figure 4 is a cross-sectional view on the line 4—4 of Figure 3, showing the trip positioned in the path of the bags fed to the machine;

Figure 7 is a detail sectional view on the line 7—7 of Figure 3, showing the clutch for controlling the feeding conveyer in operative position;

Figure 8 is a detail sectional view showing the feeding conveyer clutch in inoperative position;

Figure 9 is a detail sectional view on the line 9—9 of Figure 8, showing the means provided for automatically rendering the feeding conveyer clutch inoperative;

Figure 10 is a detail sectional view on the line 10—10 of Figure 9;

Figure 11 is a sectional plan view on the line 11—11 of Figure 3, showing the means for vertically adjusting the discharge end of the feeding mechanism with respect to the machine;

Figure 16 is a detail sectional view on the line 16—16 of Figure 14, showing the means for compressing and creasing the flaps and applying gum thereto;

Figure 17 is a detail sectional view on the line 17—17 of Figure 15, with some of the parts omitted, showing the means for preventing the creasers from contacting with the gummed periphery of the gumming roll;

Figure 18 is a detail sectional view on the line 18—18 of Figure 15, showing the means for driving the folding fingers and the gum applying mechanism;

Figure 19 is a detail view showing a portion of the gum applying mechanism;

Figure 20 is a detail sectional view on the line 20—20 of Figure 19, showing the brushes for gumming portions of the bag top walls, and also showing the fingers for spreading the walls of the bag mouth;

Figure 21 is a detail sectional view on the line 21—21 of Figure 20, showing different positions of the fingers for spreading the walls of the bag mouth;

Figure 22 is a diagrammatic view showing different positions of the folding fingers for initially folding the bag top walls;

Figure 23 is a detail sectional view showing the supporting means for the bag top folding fingers;

Figure 24 is an enlarged detail sectional view on the line 24—24 of Figure 23;

Bag holding means

Figure 14:
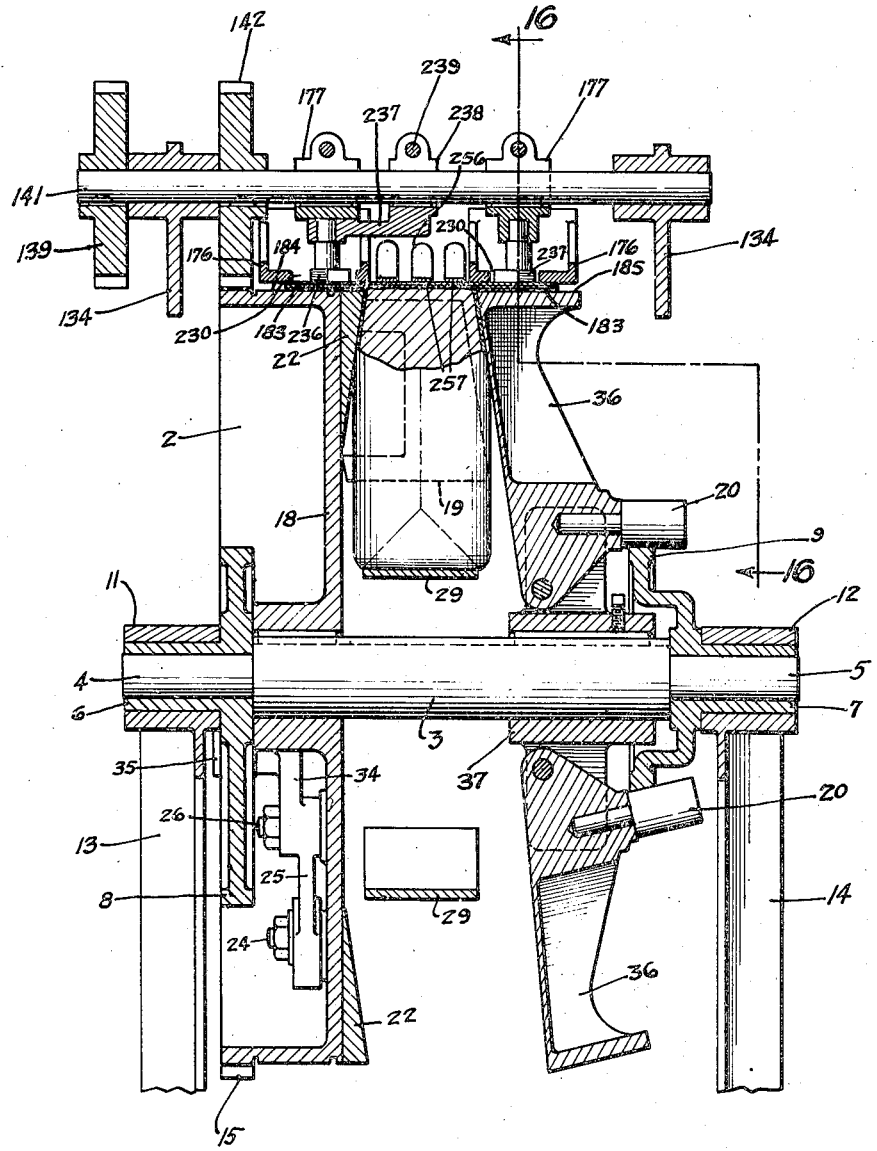
Figure 14 is a detail sectional view showing the means for squaring the upper portion of the bag body.

The novel bag closing and sealing machine disclosed in this invention comprises a rotatable member 2 mounted upon and secured to a shaft 3, preferably having reduced end portions 4 and 5 rotatably mounted in sleeves 6 and 7, respectively, provided upon a pair of fixed cams 8 and 9, as best shown in Figure 14. The sleeves 6 and 7 are shown non-rotatably mounted in split hubs 11 and 12 provided at the upper portions of the side frame members 13 and 14 of the machine frame. The rotatable member 2 will hereinafter be referred to as a drum. The drum 2 has a peripheral gear 15 which meshes with a drive pinion 16 adapted to be driven from a drive shaft 17, by mechanism which will subsequently be described. The shaft 17 is rotatably mounted in suitable bearings provided on the machine frame.

Figure 12:
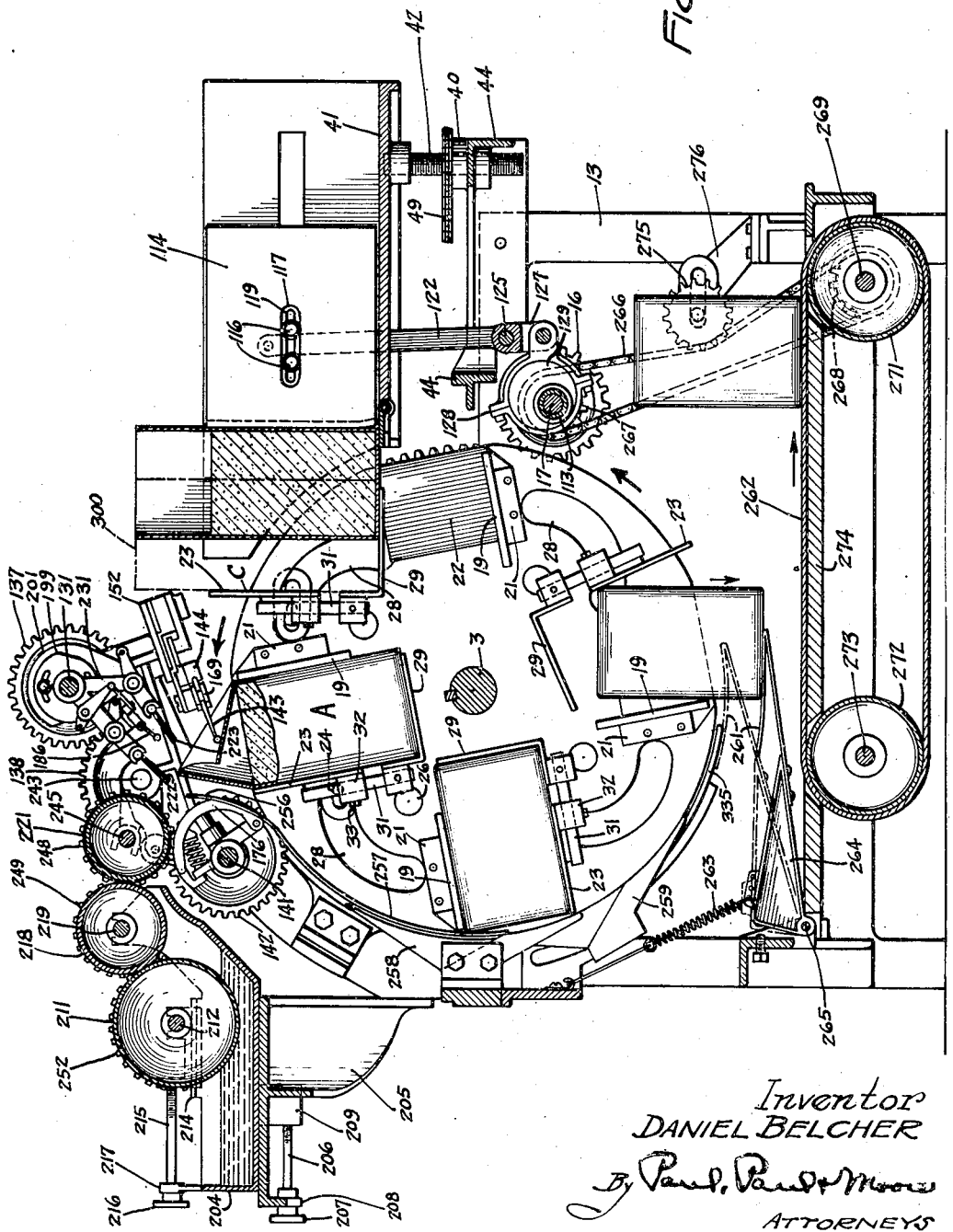
Figure 12 is a longitudinal sectional view taken substantially on the line 12—12 of Figure 2, showing the relative positions of the walls of the bag holding compartments, and also showing the folding and gum-applying mechanisms.
Figure 13:
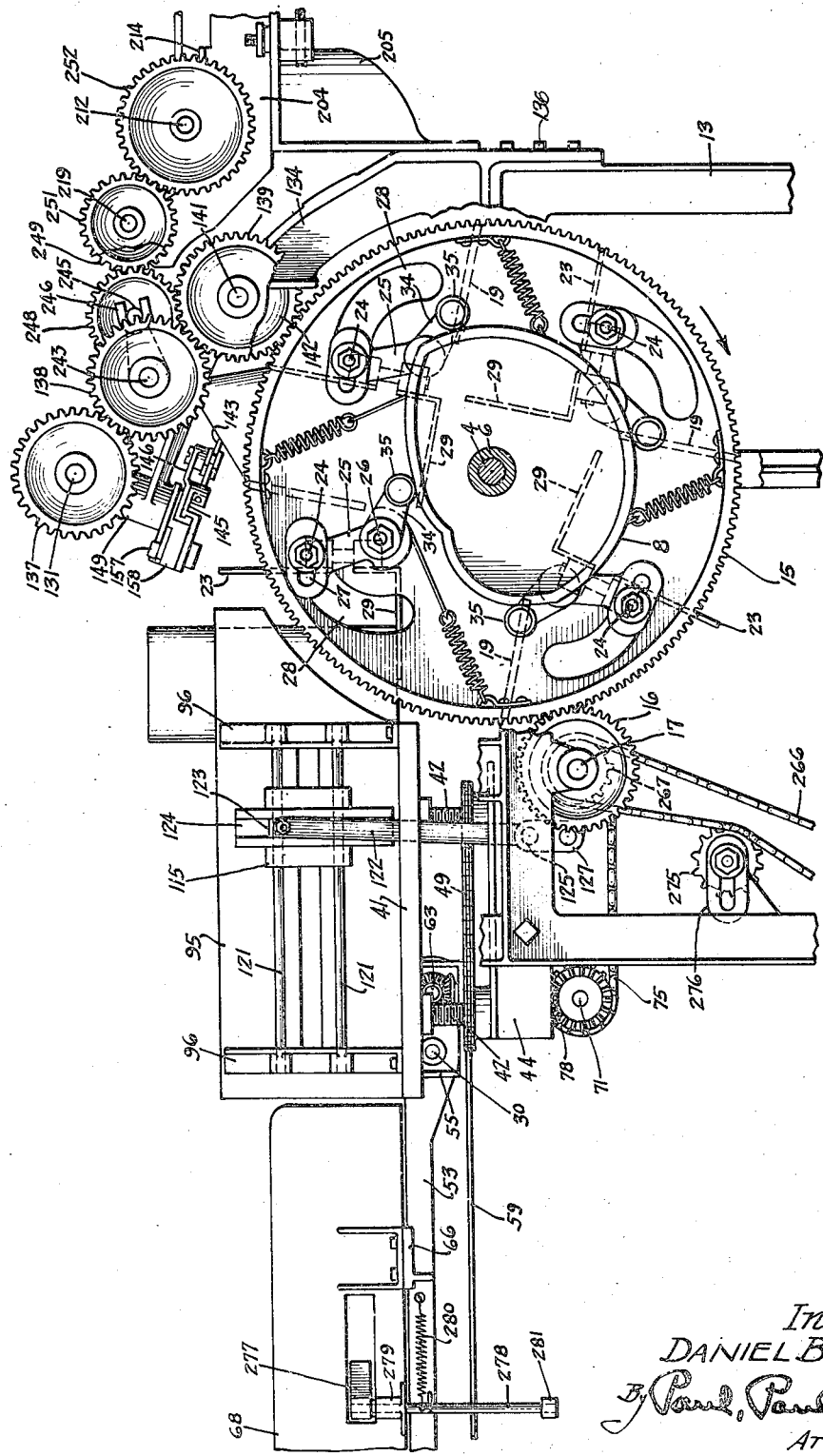
Figure 13 is a view showing the opposite side of the machine from that shown in Figure 1.

As best shown in Figures 12 and 14, the drum 2 has a wall 18 which carries a plurality of compartments into which the bags are delivered from a suitable feeding means which will subsequently be described. As the compartments are of like construction, but one will be described in detail. Each compartment comprises a rear wall 19, here shown secured to a flange 21 which may be integrally formed with a wedge-shaped member 22, secured to the wall 18 by suitable means, not shown. A front wall 23 is supported upon a stud 24 secured to an arm 25 pivotally mounted upon a stud 26 secured to the exterior of the wall 18, as shown in Figure 13. The stud 24 is mounted for adjustment in a slot 27, whereby the spacing between the walls 19 and 23 may be varied to adapt the compartment to bags of different sizes. The stud 24, it will be noted, is adapted for swinging movement in an arcuately formed slot 28 provided in the wall 18 of the drum.

The compartment has a bottom wall 29 which is adjustably supported with respect to the end wall 23 by means of a rod 31 received in a suitable socket provided in a projection 32 on the front wall 23. The rod 31 is adjustably secured to the projections 32 by such means as a set screw 33. By thus supporting the bottom wall 29 upon the front wall 23, it may be moved in a direction towards or away from the shaft 3 to accommodate the compartment to the height of the bags to be sealed. It is also to be noted that the bottom wall 29 will move as a unit with the wall 23, when the latter is moved by the action of the arm 25.

The means provided for actuating the wall 23 and bottom 29 of the compartment is shown in Figure 13, and comprises an arm 34, here shown integrally formed with the arm 25, and carrying a roller 35 adapted to travel upon the periphery of the cam 8. The cam is so shaped that when the compartment approaches the feeding means, the wall 23 and bottom 29 will assume the positions shown in Figure 12, whereby a bag may be delivered onto the bottom 29 in an upright position. As the drum continues to rotate, the cam 8 will cause the wall 23 and bottom 29 to assume the positions shown at the upper left hand portion of Figure 12, in which positions they will remain until the compartment reaches its discharging position at the lower portion of the drum, whereupon the wall 23 and bottom 29 will be actuated to permit the sealed bag to discharge from the compartment by gravity.

Figure 32:
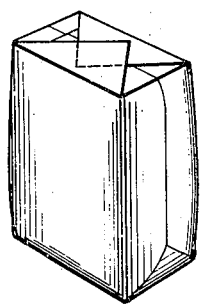
Figure 32 is a perspective view showing a bag which has been closed and sealed by the machine herein disclosed.

By thus holding the filled bag in an upright position until after the open top thereof has been partially closed, the material in the bag will not relatively move therein before the closing operation is started, whereby the bag top walls may be accurately folded into closing relation, as shown in Figure 32.

The sides of the compartments are defined by the wall 18 of the drum 2, and a plurality of hinged members 36 are mounted on a hub 37 which is adjustably secured to the shaft 3 so that it may be moved in a direction towards or away from the wall 18 of the drum, to thereby vary the width of the spaces between said members and the wall 18 to suit the size of the bags to be sealed. The hinged members 36 carry rollers 20 adapted to travel upon the periphery of the cam 9, and springs 38 constantly tend to swing the members 36 in an outward direction to hold the rollers 20 in constant engagement with the periphery of the cam 9.

The hinged members 36 cooperate with the wedge-shaped members 22 to shape or square the upper portions of the bag bodies on a line substantially coincident with the level of the material therein, as will be seen by reference to Figure 14. The hinged members 36 are adapted to be swung outwardly away from the wall 18, when the compartments pass beneath the shaft 3 supporting the drum 2, so as to permit the sealed bags to readily discharge from the compartments.

*Feeding means*

Figure 1:
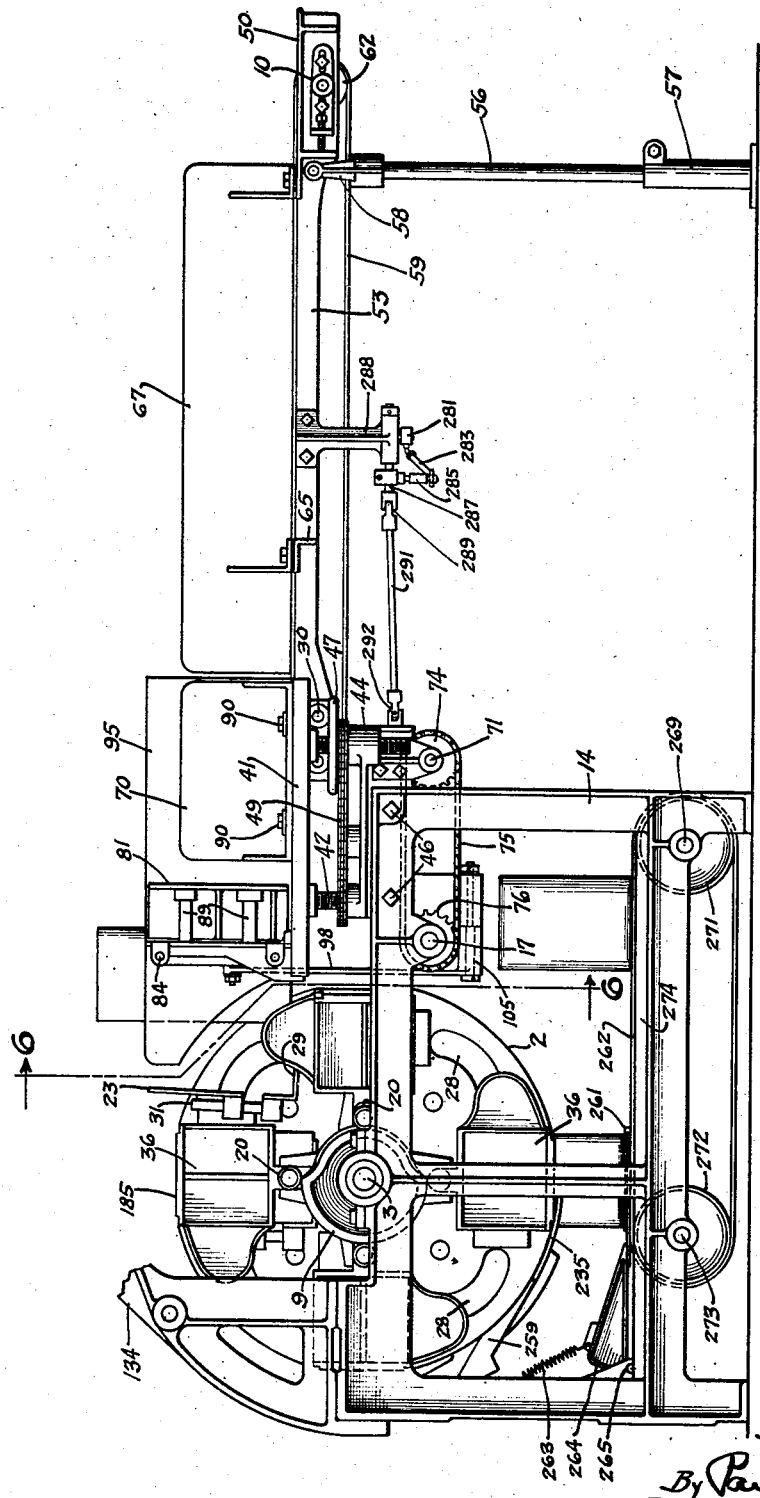
Figure 1 is a side elevational view of my improved bag closing and sealing machine with some of the parts broken away.
Figure 5:
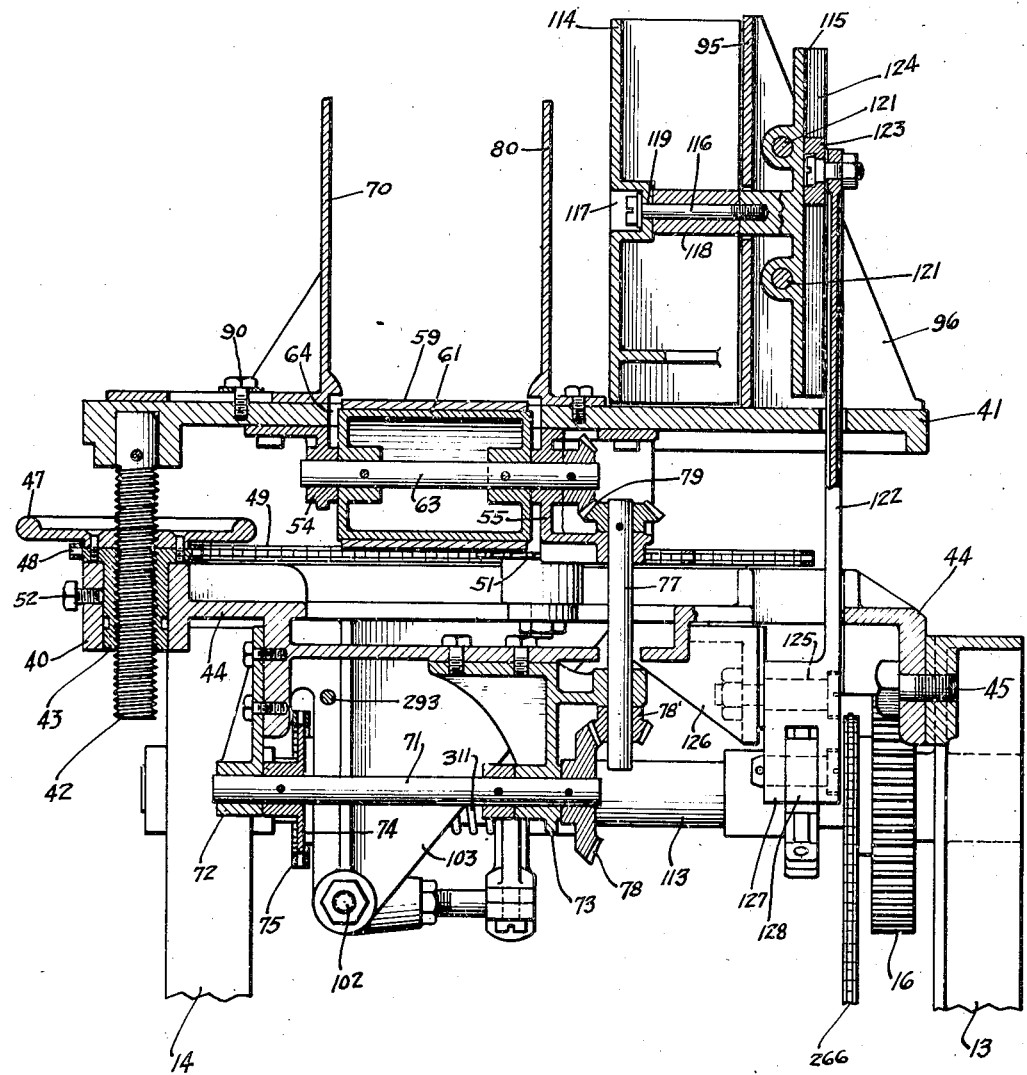
Figure 5 is a cross-sectional view on the line 5—5 of Figure 3, showing the drive for the feeding conveyer.

An important feature of this invention resides in the means provided for feeding the filled bags into the compartments. As shown in Figures 1 to 6, a suitable plate 41 is shown provided with a plurality of depending threaded studs 42, received in threaded sleeves 43 rotatably mounted in suitable bearings or guides 40 provided in a frame 44 suitably secured to the main frame members 13 and 14 by suitable bolts 45 and 46, as shown in Figures 1 and 5. The plate 41 is adapted for vertical adjustment by rotation of the sleeves 43, whereby the top surface thereof may be properly positioned with respect to the bottom walls 29 of the compartments, as the latter move into bag-receiving position, as shown in Figure 12.

The means provided for relatively adjusting the position of the plate 41 is best shown in Figures 5 and 11 and consists of a hand wheel 47 secured to one of the sleeves 43. Each sleeve has a sprocket 48 secured thereto, and these sprockets are operatively connected together by a suitable chain 49 for simultaneous operation. An idler sprocket 51 is adjustably mounted upon the frame 44 to provide means for adjusting the tension in the chain 49. One of the sleeves 43 may be locked against rotation as by means of suitable set screws 52, as shown in Figure 5, whereby all of the sleeves will be similarly locked because of the sprockets 48 being interconnected by the chain 49.

A supporting member 53, preferably of channel cross section, as shown in Figure 4, has a pin 30 pivotally connecting one end thereof to suitable brackets 54 and 55 secured to the plate 41, as best shown in Figures 3 and 5. The opposite end of the supporting member 53 is adjustably supported upon a standard 56, the lower end of which is mounted in a split base member 57, whereby the standard 56 may be vertically adjusted to properly position the upper end of the supporting member 53. The upper end of the standard 56 is provided with a suitable yoke 58 which is pivotally connected to the member 53, as best shown in Figure 1. The member 53 is provided at its receiving end with an enlarged plate portion 50, as shown in Figure 2, adapted to receive the bags to be sealed.

A suitable conveyer belt 59 is mounted upon rollers 61 and 62 so arranged that the upper run of the belt will be supported directly upon the upper surface of the supporting member 53, as shown in Figures 3 and 4. The belt 59 passes through an opening 60 provided in the top plate 50. The roller 61 is secured to a shaft 63 rotatably mounted in the brackets 54 and 55, and the roller 62 is adjustably mounted in the opposite end of the adjusting member 10, whereby the conveyer belt 59 may be adjusted to the proper tension. A suitable opening 64 is provided in the plate 41 adapted to receive the conveyer belt 59 and the upper portion of the roller 61, as shown in Figures 3 and 5, and whereby the upper surface of the upper run of the belt will be substantially alined or positioned slightly above the upper surface of the plate 41, as will be noted by reference to Figure 3. As shown in Figures 2 and 4, the supporting member 53 is provided with outwardly projecting lugs 65 and 66. A suitable side guide wall 67 is adjustably secured to the lug 65 and top plate 50, and a guide wall 68 is fixedly secured to the lug 66 and plate 50. These guide walls prevent the bags or containers from tipping laterally, when traveling over the conveyer. The adjustability of the side wall 67 permits the feeding conveyer to be adjusted to different sizes of bags.

The means for driving the conveyer belt 59 is best shown in Figures 1, 3, and 5, and comprises a driven shaft 71 mounted in suitable brackets 72 and 73 secured to the frame 44. A sprocket wheel 74 is secured to the shaft 71 and has a chain 75 operatively connecting it with a sprocket 76, non-rotatably mounted upon the drive shaft 17. The shaft 71 is shown operatively connected to an upright shaft 77 by means of bevel gears 78 and 78', and the upper end of the shaft 77 is similarly connected to the shaft 63 of the conveyer by a bevel gear drive 79. By thus operatively connecting the conveyer belt 59 with the drive shaft 17, it will rotate continuously when the machine is in operation. The bevel gear 78' is slidably mounted upon the shaft 77 to permit up-and-down adjustment of the plate 41, it being understood that said shaft is movable with said plate. Suitable means, not shown, is provided for preventing the sprocket 78' from relatively rotating upon the shaft.

Figure 2:
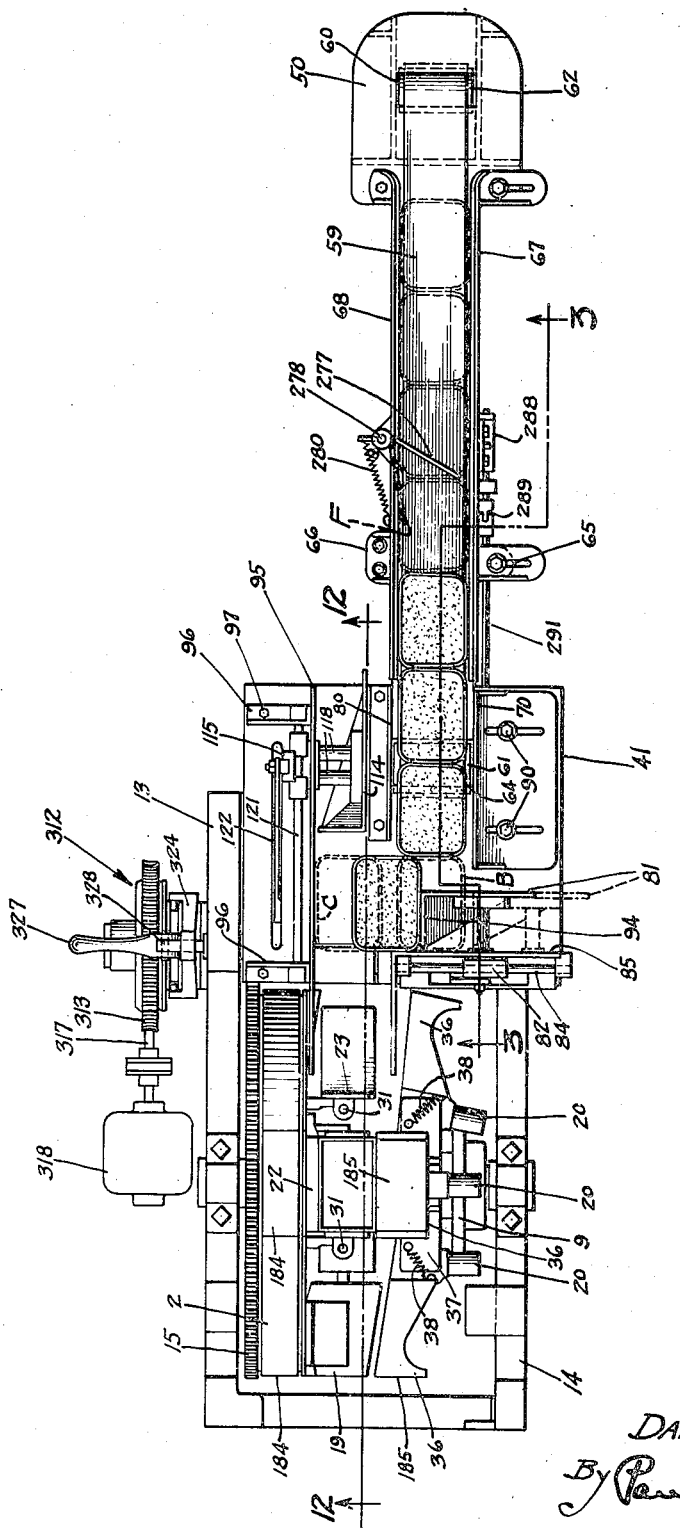
Figure 2 is a plan view of Figure 1.

As shown in Figure 2, the conveyer belt 59 is off-set from the center line of the compartments in the drum 2, to facilitate feeding the bags into the compartments, one at a time. Means is therefore provided for laterally feeding the bags from the discharge end of the feeding conveyer into alinement with said compartments, from which position they are successively fed into the compartments.

Figure 6:
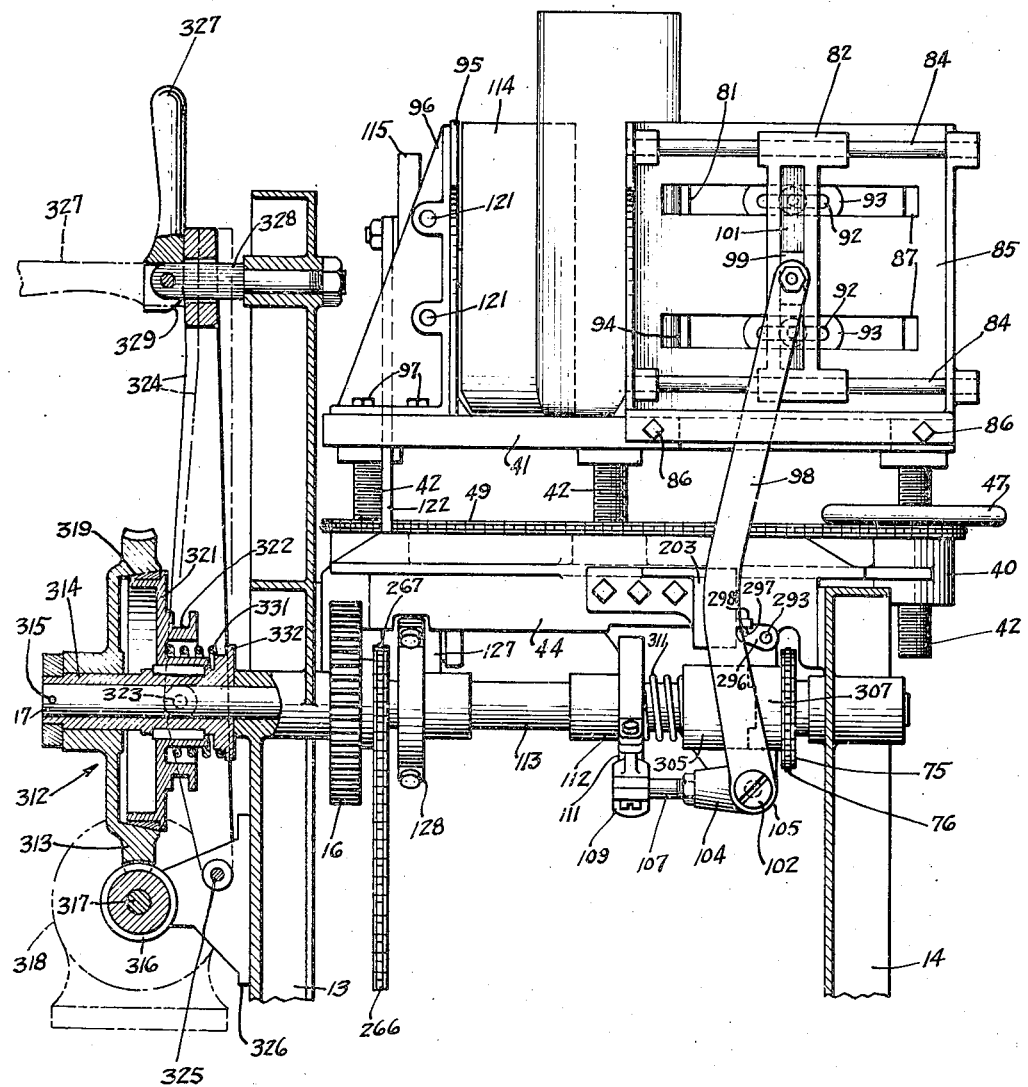
Figure 6 is a cross-sectional view on the line 6—6 of Figure 1, partially broken away to show the construction of the main operating clutch.

The means provided for laterally moving the bags or containers from the line of travel of the conveyer into alinement with the compartments, is best shown in Figures 2, 3, 6, 7, and 12. A pusher 81 is adjustably secured to a cross head 82 by means of bolts 83, as shown in Figure 3, and operates in a direction crosswise to the direction of travel of the feeding conveyer, as will be noted by reference to Figures 2 and 6. The cross head 82 is slidable upon spaced rods 84 mounted on an upright guide plate 85 secured to the horizontal plate 41, by such means as bolts 86. (See Figure 6.) The upright guide plate 85 is provided with suitable slots 87 adapted to receive lugs or hubs 88 provided upon the cross head 82. The lugs 88 have threaded sockets adapted to receive the screws 83, and suitable spacers 89 are provided upon the bolts or screws 83, as shown in Figure 3, whereby the pusher 81 may be fixedly secured to the cross head in the position shown. The heads of the screws 83 are received in recesses 91 provided in the face of the pusher 81 so as to prevent the heads from engaging the walls of the bags, when the latter are fed against the pusher by the action of the feed belt 59. Suitable slots 92 are provided in the offset portions 93 of the pusher 81, whereby the pusher may be relatively adjusted with respect to the cross head 82 to position the forward end 94 thereof so as to cause the pusher to feed the bags into alinement with the compartments, and substantially into engagement with a fixed upright wall 95, secured to a pair of brackets 96 which, in turn, are secured to the horizontal plate 41 by suitable bolts or screws 97 as shown in Figure 6. Side wall sections 70 and 80 are secured to the horizontal plate 41, and form extensions of the side walls 67 and 68, respectively, of the feeding conveyer. The wall section 70 is adjustably secured to the plate by bolts 90, as shown in Figure 2.

The pusher 81 is actuated by an arm 98 having a roller 99 pivotally mounted at the upper end thereof and adapted to travel in an elongated recess 101 provided in the cross head 82. The arm 98 is pivotally mounted upon a stud 102 secured to a depending portion 103 of the frame 44, as shown in Figure 5. A lateral extension 104 is provided upon the hub 105 of the arm 98, and has a threaded socket 106 adapted to receive a stem 107 provided with a spherical head 108. This head is received in a split cap 109 of a pitman 111 mounted upon an eccentric 112, secured to a sleeve 113 mounted for relative rotation upon the drive shaft 17. When the eccentric 112 is rotated, the stem 107 will be oscillated in a vertical plane from the axis of the pivot 102 because of being operatively connected to the eccentric 111. Such movement of the stem 107 will impart an oscillatory movement to the arm 98, whereupon the pusher 81 will be reciprocated in a direction transversely to the line of travel of the conveyer belt 59. The periphery of the eccentric 112 is preferably spherical, as shown in Figure 8, to allow for the swinging movement of the spherical head 108 of the arm 98 about the pivot 102.

A second pusher 114 is mounted for reciprocal movement in alinement with the compartments in the drum 2, as shown in Figure 2. The pusher 114 is secured to a cross head 115 by means of suitable bolts 116 having their heads received in recesses 119 provided in the face of the pusher, and having their terminals received in threaded sockets provided in the cross head 115. Suitable spacing collars 118 are provided on the bolts 116 to properly position the pusher with respect to the wall 95. The aperture 119 provided in the pusher 114 for the bolts 117, is elongated, as shown in Figure 12, to permit the pusher to be relatively adjusted with respect to the cross head 115 in a direction lengthwise of the travel thereof.

The cross head 115 is slidably supported upon spaced rods 112 secured to the upright brackets 96, as shown in Figures 2 and 13. The cross head is actuated by means of an arm 122 having a roller 123 pivotally mounted upon the upper end thereof and slidable in a recess 124 provided in the cross head, as best shown in Figure 5. The arm 122 is pivotally mounted upon a stud 125 secured to a depending portion 126 of the frame 44, as shown in Figures 5 and 12. The lower end of the arm 122 has a fork 127 adapted to receive one end of a pitman 128 which is mounted upon an eccentric 129, secured to the sleeve 113, as shown in Figure 7. When the eccentric 129 is rotated, the pitman 128 will oscillate the arm 122 and thereby cause the pusher 114 to be reciprocated. The mechanism for controlling the operation of the pushers to successively feed the bags or containers into the compartments of the drum will subsequently be described.

*Folding mechanism*

Figure 15:
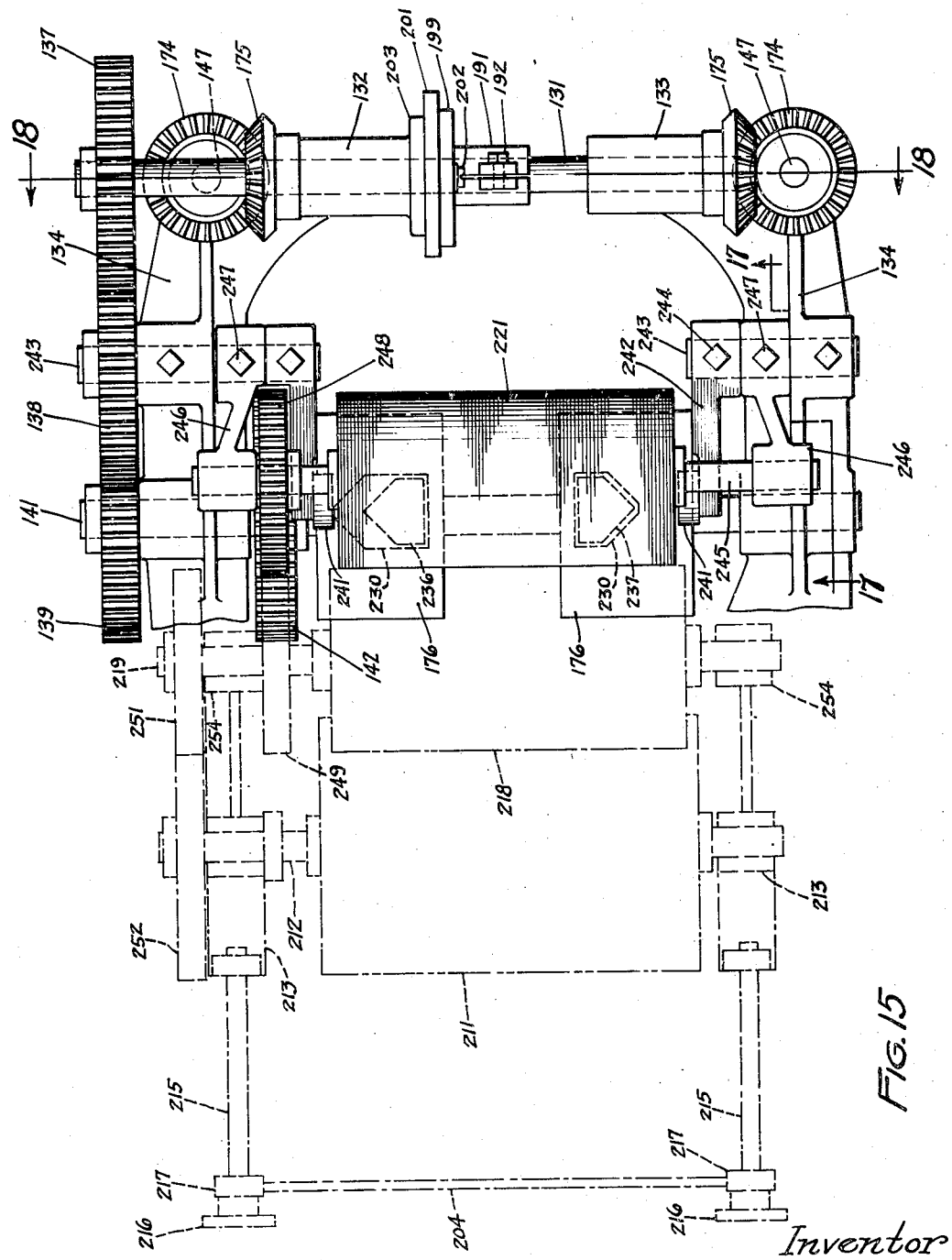
Figure 15 is a plan view of a portion of the machine showing the driving connections between the various mechanisms thereof.
Figure 25:
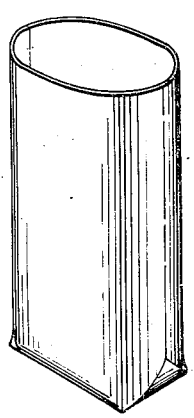
Figure 25 is a perspective view showing a bag before its top has been closed and sealed.

The bag top folding mechanism is shown in Figures 12 to 24, inclusive, and, as best shown in Figure 15, comprises a shaft 131 mounted in suitable bearings 132 and 133 provided in an extension 134 of the main frame of the machine. The extension 134 is here shown as comprising two side frames secured to the main frame by suitable bolts 136, as shown in Figure 13. The shaft 131 has a gear 137 secured to one end thereof which meshes with an idler 138 which, in turn, is driven from a gear 139 secured to one end of a shaft 141. A gear 142 is secured to the opposite end of the shaft 141, and meshes with the ring gear 15 of the drum 2, as shown in Figure 13. Thus, it will be seen that when the drum 2 is rotating, the shafts 141 and 131 will also rotate.

A pair of folding fingers 143 are mounted beneath the shaft 131 and are adapted to engage and inwardly fold the rear walls of the bag tops and to outwardly stretch other wall portions thereof. As the folding fingers are of like construction, but one will need to be described in detail. Each folding finger has one end suitably secured to a head 144 pivotally mounted in an arm 145 movably supported upon a second arm 146, which is secured to the lower end of an upright shaft 147. The shaft 147 is rotatably mounted in a sleeve 148 secured in a hub 149 of the frame extensions 134, by means of a set screw 151. The sleeve 148 carries at its lower end a suitable cam 152. The lower arm 145 is provided with a square socket 153 adapted to receive the squared end portion 154 of a short stub shaft 155, provided at its upper end with an arm 156 having a cam roller 157 thereon adapted to ride upon the periphery of the cam 152, as best shown in Figure 22. The enlarged portion 158 of the arm 146 has an annular recess 159 surrounding the shaft 155, and in which is mounted a suitable spiral spring 161, one end of which is secured to the outer wall of the annular recess 159, as indicated at 162 in Figure 22, and the inner end thereof being secured to the arm 156 by a suitable pin, indicated at 163 in Figures 22 and 23. The spring 161 functions to hold the cam roller 157 in engagement with the periphery of the cam 152. The stub shaft 155 is pivotally mounted in a suitable bearing 164 provided in the enlarged portion 158 of the arm 146, whereby the lower arm 145 may oscillate relatively to the arm 146 about the axis of the stub shaft 155. The arm 145 is shown provided with a tongue 165 engaged with an arcuately formed recess 166 provided in the enlarged portion 158 of the arm 146 to provide an additional support for the arm 145.

The folding fingers 143 are here shown provided with spherical heads 167 which are offset from the longitudinal center line of the fingers, as shown in Figure 23. The shanks 168 of the folding fingers are preferably square in cross section, as best shown in Figure 24, and are adapted for movement in guides 169 provided in studs 171 pivotally mounted in the outer ends of the arms 146. By squaring the shanks of the fingers as shown, only the corners thereof will directly engage the guides or bearings 169, so that any gum which may be carried into the guides by the shanks will not hinder the operations of the shanks therein. Each guide 169 comprises a pair of rollers 172 between which the shanks 168 of the fingers move, as indicated by the full and dotted lines in Figure 22. By reference to Figure 23, it will be noted that the folding fingers are provided at their bottoms with transverse recesses 173 providing ribs which are adapted to engage the gummed surfaces of the bag top walls and thus prevent the entire lower portions of the outer ends of the fingers from engaging the gum and removing it from the bag top walls. The upright shafts of the arms 146 are provided with bevel pinions 174 adapted to mesh with similar pinions 175 secured to the shaft 131, as best shown in Figure 18. The cams 152 are so shaped as to cause the folding fingers to assume the various positions indicated in dotted lines in Figure 22 for each cycle of operation thereof, it being understood that the arms 145 and 146 rotate about the axes of the shafts 147.

Creasing mechanism

Figure 28:
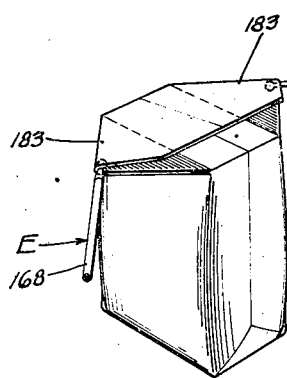
Figure 28 is a view showing the next step in the folding operation whereby oppositely extending flaps are provided.
Figure 29:
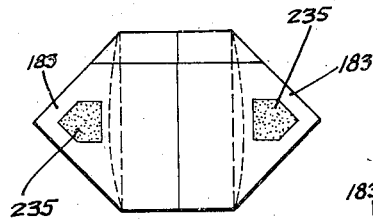
Figure 29 is a plan view of Figure 28.
Figure 30:
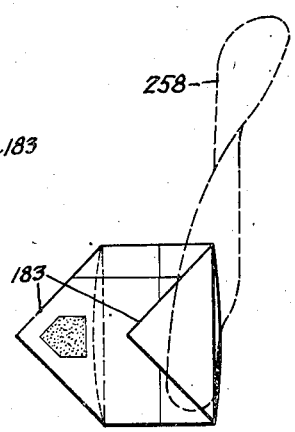
Figure 30 is a view showing in dotted lines the means for inwardly folding one of the flaps over the bag body.

Means are provided for creasing the partially folded bag top walls in the operation of closing the bag top, to facilitate folding the partially folded bag top walls inwardly, over the bag body, when said walls are folded, and whereby all of the bag tops will be substantially uniform in appearance when closed and sealed. Such means is best shown in Figures 12, 14, 15, 16, and 17 and comprises a pair of arcuately formed creasing members 176 pivotally supported upon split hubs 177 by suitable pivots 170. The hubs 177 are secured to the shaft 141, as shown in Figure 16. The creasing members have hooked end portions 178 adapted to engage projections 179 provided upon the hubs 177 to limit their swinging movement in one direction. Suitable springs 181 are interposed between the projections 179 and suitable seats 182 provided upon the creasing members to constantly urge the creasing members in a downward direction when viewed as shown in Figure 16. The creasing members are adapted to press the partially folded bag top walls 183 firmly against flat faces 184 and 185 provided upon the periphery of the rotatable member 2 and on the hinged wall members 36 of the compartments, as shown in Figure 14. The partially folded bag top walls 183 form laterally extending flaps, as shown in Figures 28, 29, and 30.

Bag top spreading fingers

Figure 27:
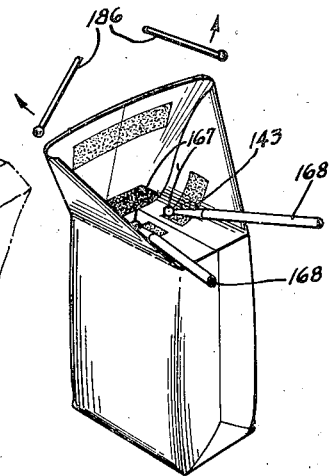
Figure 27 is a view showing the initial step in the operation of folding the bag top walls to close the bag mouth.

To assure that the bag top walls will be folded uniformly, a pair of small spreading fingers 186 are mounted adjacent to the folding fingers 143 and are adapted to be received in the open mouth of the bag to be sealed and spread the bag top walls outwardly simultaneously as the folding fingers initially engage the rear end wall of the bag top and folds it inwardly, as best shown in Figure 27. By thus passing the spreading fingers 186 through the open mouth of the bag top, simultaneously as the rear end wall thereof is folded inwardly over the bag body, each bag top will be uniformly folded, as shown in Figures 27 to 32, inclusive.

The spreading fingers 186 are removably supported in members 187 and 188 pivotally supported upon a bracket 189 adjustably secured to the shaft 131 by means of a split hub 191 and a clamping screw 192. The members 187 and 188 have intermeshing gear teeth so that they will operate in opposite directions, as indicated by the full and dotted lines in Figure 21.

The spreading fingers 186 are adapted to be oscillated by means of an arm 193 secured to a shaft 190 mounted in the bracket 189 and having a link 194 operatively connecting it with the member 187 of the spreading fingers. The link 194 has a ball and socket connection with the arm 193, as indicated at 195 in Figures 20 and 21. A short arm 197 is secured to the opposite end of the shaft 190 and carries a cam roller 198 adapted to travel upon the periphery of a cam 199 adjustably secured to a cam 201 by means of screws 202 received in threaded engagement with a flange 203 provided upon one end of the hub 132 of the frame extension 134. By thus securing the cams 199 and 201 to the hub 132, they may be relatively adjusted with respect to each other and also with respect to the hub 132, so as to properly time the operation of the spreading fingers with the movements of the folding fingers 143.

Gumming mechanism

The gumming mechanism is shown in Figures 12 to 17, inclusive, and comprises a suitable gum container 204 mounted upon a bracket 205 secured to the main frame and adapted for relative adjustment thereon by means of a threaded stem 206 having secured thereto a hand wheel 207. The stem 206 is rotatably supported in a guide 208 provided upon the bracket 205 and is received in threaded engagement with a depending portion or lug 209 of the gum container. By rotating the hand wheel 207, the container 204 may be moved towards or away from the folding mechanism.

The gum feed roll 211 has a shaft 212, the terminals of which are supported in brackets 213 slidably mounted in guides 214 provided upon the side walls of the container 204. A threaded stem 215 is received in threaded engagement with each bracket 213, and these stems are provided with hand wheels 216, whereby the stems 215 may be rotated to move the feed roll 211 in a direction towards or away from the folding mechanism, as will readily be understood by reference to Figure 12. Suitable guides 217 support the outer ends of the stems 215.

A transfer roll 218 is mounted in suitable bearings 254 provided in the side walls of the container 204 and is adapted to peripherally engage the feed roll 211, as shown in Figure 12. A gumming roll 221 peripherally engages the transfer roll 218, and a plurality of gum-applying brushes 222 and 223 are adapted to engage the periphery of the gumming roll 221 to receive supplies of gum to be transferred to portions of the bag top walls.

Figure 26:
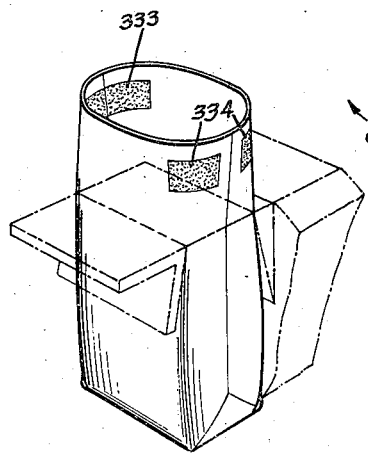
Figure 26 is a perspective view showing portions of the bag top walls gummed, and indicating in dotted lines the means for squaring the upper portions of the bag body, adjacent to the level of the material therein.

The mechanism for operating the brushes 222 and 223 is best shown in Figures 12, 19, 20, and 21. As here shown, the brush 222 is supported in an arm 224 pivotally mounted in the lower end portion of the bracket 189 and having an arm 225 carrying a cam roller 226 which engages the periphery of the cam 201. The brushes 223 are secured to a suitable bar 227 which is secured to an arm 228 adjustably secured to a stud 229, mounted for rocking movement in a bearing provided at one end of an extension 231 provided upon the bracket 189. The arm 228 has an elongated aperture or slot 232 adapted to receive the stud 229 whereby the arm 228 may be adjusted in a lengthwise direction with respect to the stud to properly position the brushes 223 with respect to the bag top walls. A crank arm 233 is secured to the opposite end of the stud 229 and carries a roller 234 which also rides upon the periphery of the cam 201, as clearly shown in Figures 19 and 20. The cam 201 and brushes 222 and 223 are so adjusted and timed that when they rotate about the axis of the shaft 131, they will apply gum to certain portions of the front and rear bag top walls, as best indicated in Figures 26 and 27, so that when said bag top walls are initially folded inwardly, one over the other, the gum on the surfaces thereof will cause them to become firmly united together.

Means are also provided for applying gum to the upper surfaces of the outwardly projecting flaps 183 of the partially folded bag top, as indicated at 235 in Figures 29 and 30, and consists of members 236 and 237, one of which is mounted in a hub of one of the creasing members 176, and the other being supported in a bracket 237' having a split hub 238 whereby it may be adjustably secured to the shaft 141. The hub 238 is provided with a clamping bolt or screw 239. The gum applying members 236 and 237 are mounted within the creasing members 176 as best shown in Figures 14 and 16, and are adapted to project through suitable openings 230 provided in the creasing members 30 as to engage the upper surfaces of the outwardly extending side flaps 183 of the bag top, as the bags pass through the folding mechanism. The members 236 and 237 are adapted to engage the periphery of the gumming roll 221, as shown in Figure 17, each time the shaft 141 makes one revolution. By adjustably mounting the gumming member 236 upon the shaft 141, the spacing between the gumming members 236 and 237 may be varied to suit the sizes of the bags to be sealed.

Means is provided for preventing the peripheries of the creasing members 176 from engaging the gummed periphery of the gumming roll 221, and consists of a pair of rollers 241 rotatably mounted in arms 242 adjustably secured to stub shafts 243 which, in turn, are secured to the upper portions 134 of the machine frame by screws 240. (See Figures 15 and 17.) Suitable set screws 244 adjustably secure the arms 242 to the stub shafts 243. The rollers 241 are so positioned that when the creasing members 176 are rotated, the peripheries thereof will engage said rollers, whereby the creasing members will oscillate about their pivots 170 to the position shown in Figure 17 whereby they cannot engage the gummed periphery of the gumming roll 221. The gum applying members 236 and 237, however, will engage the periphery of the gumming roll 221, as hereinbefore stated, because of being positioned in the openings 230 in the creasing members, whereby they will receive supplies of gum which will be transmitted to the extended bag top portions or flaps 183, as shown in Figures 29 and 30.

The gumming roll 221 is secured to a shaft 245 mounted in suitable forked brackets 246 adjustably secured to the stub shafts 243 by suitable set screws 247. A gear 248 is secured to the gumming roll shaft 245 and meshes with the gear 142. The transfer and feed rolls are positively driven by gears 249, 251, and 252, the two former being secured to the shaft 219 of the transfer roll 218, and the latter to the shaft 212 of the feed roll 211. The gear 249 meshes with the gear 248. The shaft 219 of the transfer roll is shown supported in suitable bearings 254, and the shaft 212 of the feed roll is supported in the brackets 213, as hereinbefore stated.

The folding mechanism further comprises a pair of spaced apart guide members 256 arranged so as to engage the leading or front wall of the bag top and fold it inwardly over the rear end wall, as the bag advances from the position indicated at A in Figure 12. The curved portions 257 of the guides 256 will retain the folded front and rear walls of the bag top in the positions shown in Figure 28, until the outwardly projecting wall portions or flaps 183 of the bag top engages a pair of folding members 258 and 259 which function to fold, first one flap 183 inwardly over the bag body, and then the opposite flap inwardly over said first mentioned flap, as clearly indicated by the full and dotted lines in Figures 30 and 31. When the folded bag top leaves the folding members 258 and 259, it will engage a yieldable member 261 which will retain the folded wall portions in closing relation until the closed bag top is delivered onto a conveyer 262, provided at the bottom of the machine. A suitable spring 263 normally holds the yieldable member 261 in the dotted line position, indicated in Figure 12. The member 261 is suitably secured to a supporting member 264 pivoted to the main frame, as indicated at 265.

The conveyer belt 262 is driven by a chain 266 mounted upon sprockets 267 and 268, the former being secured to the sleeve 113 mounted upon the drive shaft 17 and the latter to a shaft 269 mounted in the lower portion of the machine and having a roller 271 secured thereto. A similar roller 272 is secured to a shaft 273 at the opposite end of the machine, and these rollers carry the conveyer belt 262. The upper run of the conveyer belt is shown supported upon a plate 274. A suitable idler sprocket 275 is shown engaging the chain 266 and is slidably mounted in a bracket 276 whereby it may be positioned to take up slack in the chain 266.

*Operating mechanism*

The operating mechanism is shown in Figures 1 to 11, inclusive, and comprises a trip 277 secured to the upper end of a shaft 278 shown mounted in a suitable bearing 279 provided in the fixed side wall 68 of the feed conveyer. A collar 281 is shown secured to the lower end of the shaft 278 and has an arm 282 secured thereto provided with a spherical terminal adapted to be received in one end of a connection 283 to provide a ball-and-socket joint 284 between the arm and said connection, as shown in Figures 3, 4, and 11. The opposite end of the connection 283 is preferably curved as shown in Figure 4, and has a similar spherical head adapted to be received in one end of a depending arm 285 to provide a ball-and-socket joint 286 between the connection 283 and arm 285.

The arm 285 is secured to a short shaft 287 mounted for rocking movement in the lower end of a bracket 288 secured to the conveyer supporting member 53, as shown in Figures 1 and 4. A universal joint 289 is shown connecting the shaft 287 to one end of an intermediate shaft 291, the opposite end of which has a universal joint 292 connecting it to a shaft 293, mounted in suitable bearings 294 and 295, as shown in Figure 3. A suitable crank arm 296 is secured to the shaft 293 and has a crank pin 297 adapted to engage a pin 298 secured to a slide 299 provided at its lower end with a head 301 which has a suitable cam face 302, as clearly shown in Figures 8, 9, and 10. The slide 299 is mounted in a suitable guide 303 secured to the machine frame, and the pin 298 of the slide travels in a slot 304, the lower end of which may limit the downward movement of the slide, as shown in Figure 8.

A movable clutch member 305 is slidably mounted upon suitable splines 306 provided upon the sleeve 113, as shown in Figures 8 and 9, and is adapted to interlock with a clutch member 307 secured to the drive shaft 17 by suitable means, such as a pin 308. The clutch member 307 carries the sprocket 76, as shown in Figures 7 and 8.

The movable clutch member 305 has a pin 309 positioned to engage the cam 302 of the slide 299, whereby the clutch member 305 is moved out of driving engagement with the fixed clutch member 307. A suitable spring 311 is interposed between the movable clutch member 305 and the eccentric 112 and constantly urges the clutch member 305 in a direction to engage the fixed clutch member 307. Thus, it will be noted that the fixed clutch member 307 rotates continuously with the drive shaft 17, and because of the trip 277 being normally positioned in the path of the bags as they are fed over the feeding conveyer 59, the machine will continue to operate as long as the feed conveyer is full of bags or containers, as indicated in full and dotted lines in Figure 2. When the feeding conveyer is thus full of bags, the trip 277 will be held in a position to cause the slide 299 to be elevated to the position shown in Figure 7, wherein the clutch member 305 will be in driving engagement with the clutch member 307. As soon, however, as the last bag in the feeding conveyer 59 moves out of engagement with the trip 277, the latter will return to the full line position shown in Figure 2, whereupon the slide 299 will descend to the position shown in Figure 8, whereby the pin 309 of the movable clutch member 305 will engage the cam 302 and move the clutch member 305 out of driving engagement with the fixed clutch member 307, as shown in Figure 10. When the clutch members are thus disengaged, the entire machine will come to rest with the exception of the drive shaft 17 and the feed conveyer 59.

Referring to Figures 2 and 6, it will be noted that the drive shaft 17 is provided at one end with a suitable friction clutch 312 comprising a worm gear 313 rotatably mounted upon a sleeve 314, secured to the shaft 17, by such means as a pin 315. The worm gear 313 is shown meshing with a worm 316 secured to a shaft 317 which, in turn, is suitably connected to a motor 318, as shown in Figures 2 and 6.

The gear 313 of the clutch 312 is provided with a conical clutch face 319 adapted to be frictionally engaged by a complemental clutch member 321, slidably and non-rotatably mounted upon the sleeve 314. The clutch member 321 has an annular groove 322 adapted to be engaged by suitable pins 323 provided upon a lever 324 mounted upon a pivot 325 secured in a bracket 326. The bracket 326 may also support the shaft 317 connecting the worm 316 with the motor 318.

An operating lever 327 is pivotally mounted upon a stud 328 secured to the upper portion of the machine frame, as shown in Figure 6, and has a cam face 329 adapted to engage the upper end of the lever 324 and move it in an inward direction to disengage the clutch member 321 from the clutch face 319 of the worm gear 313, when the operating lever 328 is in the dotted line position, indicated in Figure 6. A suitable compression spring 331 is interposed between the movable clutch member 321 and a flanged head 332 provided upon the sleeve 314, whereby said spring will constantly act to urge the clutch member 321 into frictional engagement with the clutch face 319 of the worm gear. When the control lever 327 is in the full line position shown in Figure 6, the clutch 312 will operate to drive the shaft 17, and when the lever 327 is in the dotted line position shown in Figure 6, the clutch 312 will be rendered ineffective to drive the shaft, whereupon the entire machine will come to rest.

*Operation*

In the operation of this novel bag closing and sealing machine, the filled bags or containers are delivered to the feeding conveyer 59 from a suitable source, in abutting relation, as shown in Figure 2. When the machine is initially started, the pusher 94 will be positioned as indicated in dotted lines in Figure 2 so that the leading bag may move into engagement with the wall 85. As soon as the leading bag engages the wall 85, the pusher 94 is actuated to move the bag laterally from the dotted line position, indicated at B in Figure 2, to the dotted line position indicated at C, wherein the bag will be positioned in the path of the pusher 114. The operation of the pusher 114 is so timed with respect to the pusher 94, that when the bag is moved from the position indicated at B to that indicated at C, the pusher will be substantially in the full line position shown in Figure 2. The pusher 81 then returns to its normal position, indicated in dotted lines in Figure 2, whereupon the pusher 114 is moved forwardly to feed the bag into the compartment passing the discharge end of the feeding mechanism, as shown in Figure 12. As the compartment passes the discharge end of the feeding mechanism, the cam 8 will cause the leading or front wall 23 of the compartment and the bottom 29 thereof to tilt backwardly with respect to the direction of rotation of the drum 2, so that the bag may readily be fed into the compartment in substantially a vertical position, and into engagement with the leading wall 23 thereof, as indicated by the dotted lines 300 in Figure 12.

The shape of the cam 8 is such that when a compartment moves from its open receiving position, shown at C in Figure 12, to the position shown at A, the walls 23 and 29 thereof will be returned to their normal bag-holding positions, in which positions they will remain until the filled compartment reaches a position below the drum shaft 3, at which time the cam 8 will cause the walls 23 and 29 to be actuated to permit the discharge of the bag from the compartment, as hereinbefore described. When a loaded compartment reaches a position substantially directly over the shaft 3, the roller 20 of the movable wall 36 of said compartment will engage the high point of the cam 9, whereby the upper portion of the movable wall 36 will be swung inwardly to compress the upper portion of the bag body between it and the wedge-shaped member 22, as clearly illustrated in Figure 2, thereby squaring the upper portion of the bag body on a line coincident with the level of the material therein. The movable wall 36 will remain in the position shown in Figure 14 for substantially one-half revolution of the drum 14, as will be clearly understood by reference to Figure 1. As soon as the movable wall 36 has been actuated to compress the upper portion of the bag body, the spreading fingers 186 will be positioned in the bag mouth substantially as shown in Figure 20, and the folding fingers 143 will subsequently move into engagement with the rear end wall of the bag top, as shown in Figure 22. It will also be noted by reference to Figure 20 that the brushes 222 and 223 will be positioned in close proximity to the front and rear end walls of the bag top so that as the bag continues forwardly, the brush 222 will be operated to apply a coating of gum to a portion of the inner surface of the front wall, as indicated at 333 in Figures 26 and 27, and the rear brushes 223 will operate to apply gum to portions of the outer surfaces of the rear wall of the bag top, as indicated at 334 in Figures 26 and 27.

During such movement of the brushes 222 and 223, the spreading fingers 186 will move outwardly from the full to the dotted line positions shown in Figure 21, and full line position shown on Figure 27, to thereby guide the side walls of the bag top, as the rear wall thereof is folded inwardly over the bag body by the folding fingers 143. (See Figures 12 and 27.) As the bag continues onwardly from the position indicated at A in Figure 12, the folding fingers 143 will advance to the positions indicated at D in Figure 22, which corresponds substantially to the positions of said fingers, as shown in Figure 12. As the folding fingers are rotated about the axes of the upright shafts 147, they will assume the positions indicated at E in Figures 22 and 28, whereupon the front wall of the bag top will be folded over the rear wall, and the side walls will be folded to form the outwardly extending flaps 183 shown in Figures 22, 28, and 29.

Figure 31:
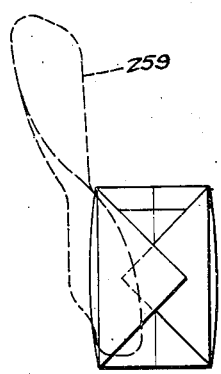
Figure 31 is a view similar to Figure 30 showing the means for inwardly folding the second flap.

Continued forward movement of the bag from the position shown at A, will cause the folded bag top walls to pass under the guide members 256, and at about the same time the outwardly extending flaps 183 will be pressed firmly against the flat faces 184 and 185 of the members 18 and 36, respectively, by the action of the creasers 176, as clearly shown in Figure 14. Simultaneously as the flaps 183 are compressed by the action of the creasers 176, the gumming members 236 and 237 will apply gum to the upper surfaces of the flaps, as indicated by the numeral 235, in Figures 29 and 30. The outwardly extending flaps 183 subsequently engage the folded members 258 and 259, whereupon they are folded inwardly over the bag body, one over the other, as shown in Figures 30 and 31, and are retained in such folded positions by means of an arcuately formed bar 335 secured to the main frame and positioned as shown in Figure 12.

When the filled compartments pass directly beneath the shaft 3, the leading wall of each compartment will be actuated by the cam 8, as shown in Figure 12, and at the same time, the movable side wall members 36 will be actuated as shown in Figure 14, whereupon the sealed bags will be discharged onto the yieldable member 261, which will be lowered by the weight of the bag thereon to permit the bag to be delivered onto the conveyer belt 262. From the conveyer belt 262, the bags may be delivered onto a suitable receiving means, not shown. The brushes 222 and 223 rotate about the shaft 131 and receive fresh supplies of gum from the periphery of the gumming roll 221 for each bag.

The operation of the machine may be controlled entirely and automatically by the bags engaging the trip 277. This trip is normally held in the full line position shown in Figure 2 by a suitable spring 280. When the trip is moved to the dotted line position indicated at F in Figure 2, by bags passing over the conveyer 59, the clutch 305 will be in driving engagement with the clutch member 307, whereby the entire machine will operate. When the trip 277 is permitted to return to its normal position, as shown in full lines in Figure 2, the slide 299 will return to the position shown in Figure 8, wherein the cam 302 will be positioned in the path of the pin 309 of the movable clutch member 305, thereby causing the latter to be moved out of driving engagement with the clutch member 307 when the pin engages the cam, as shown in Figures 8 and 10. When the clutch member 305 is thus positioned, the drum 2 and the folding and gumming mechanisms will come to rest and the pushers 94 and 114 will also come to rest. The feeding conveyer 59, however, will continue to operate so that when a filled bag is delivered onto the conveyer belt 59, it will be fed forwardly into engagement with the trip and thereby actuate the latter, whereupon the clutch member 305 will be permitted to move into driving engagement with the clutch member 307 to operate the machine, as hereinbefore described.

All of the parts and mechanisms are so timed relatively to one another that as long as bags are being delivered to the feeding conveyer 59, the machine will continue to operate automatically to inwardly fold the bag top walls over the bag body in overlapping relation, and seal them in such positions by the application of gum to certain portions of the walls thereof. The bags are delivered onto the receiving conveyer 262 in inverted positions, so as to prevent the folded bag top walls from becoming unfolded before the gum has had sufficient time to set. The construction of the machine is such that it may readily be adjusted for bags of different sizes, thereby providing such a machine well adapted for use to close and seal different sizes of bags or containers, containing finely divided material, and such as are often used in the milling industry for dispensing flour in small quantities. It will also be noted by reference to Figures 14 and 26 that the machine does not shape or form the bag bodies any more than to square the tops thereof adjacent to the level of the material therein, to facilitate uniformly folding the bag top walls, one over another, into closing relation, as shown in Figures 31 and 32, and whereby a very neat appearing and attractive package is provided.

I claim as my invention:

1. In a bag closing and sealing machine, a rotatable member adapted for continuous rotation and having a plurality of compartments each adapted to receive a filled unsealed bag whose body may be substantially cylindrical in cross-section, mechanisms for gumming and folding the bag top walls inwardly over the bag body in closing relation, means for squaring only the upper portion of the bag body at the level of the material therein to facilitate folding the bag top walls, a feeding conveyer, and means for ejecting the bags from said conveyer and delivering them into said compartments, during rotation of said movable member.

2. In a bag closing and sealing machine, a member mounted for continuous rotation and having a plurality of compartments each adapted to receive a filled, unsealed bag, mechanisms for gumming and folding the bag top walls into closing relation, means for squaring only the upper portion of the bag body at the level of the material therein to facilitate folding the bag top walls and means for feeding an unsealed bag into each compartment, said feeding means comprising a conveyer and means for transversely ejecting the bags therefrom to a position whereby they may be fed into said compartments, one at a time.

3. In a bag closing and sealing machine, a rotatable member having a plurality of compartments each adapted to receive a bag or container to be sealed, mechanisms for gumming and folding the bag top walls into closing relation, means for squaring only the upper portion of the bag body at the level of the material therein to facilitate folding the bag top walls; means for feeding an unsealed bag into each compartment, said feeding means comprising a conveyer having its longitudinal center line offset from said compartments, means at the discharge end of said conveyer for successively moving the bags therefrom into said compartments, and a trip positioned to be engaged by bags passing over said conveyer to thereby control the operation of the machine.

4. In a bag closing and sealing machine, a rotatable member having a plurality of compartments each adapted to receive a filled, unsealed bag, mechanisms for gumming and folding the bag top walls into closing relation, means for squaring only the upper portion of the bag body at the level of the material therein to facilitate folding the bag top walls, a drive shaft for said rotatable member mounted for continuous rotation, means for operatively connecting the drive shaft to said member to drive the member, means for feeding an unsealed bag into each compartment, and a trip normally positioned to be engaged by bags traveling over said feeding means and adapted to render the driving connection between said member and said shaft effective to drive the member.

5. In a bag closing and sealing machine, a member mounted for continuous rotation and having a plurality of compartments therein each adapted to receive a filled bag, folding fingers mounted to engage an end wall of the open bag top and fold it inwardly over the bag body, means movable with the travel of the bag adapted to enter the open mouth thereof and outwardly guide the side walls thereof simultaneously as said folding fingers inwardly fold said end wall, means for inwardly folding the partially folded side walls of the bag top, one over the other to seal the bag, and means for gumming surfaces of the walls of the bag top during the folding operation, to secure said walls in sealing relation.

6. In a bag closing and sealing machine, a member mounted for continuous rotation and having a plurality of compartments therein each adapted to receive a filled bag, folding fingers mounted to engage an end wall of the open bag top and fold it inwardly over the bag body, means over the path of travel of the bag and movable therewith and adapted to enter the mouth of the bag and outwardly guide the side walls thereof simultaneously as said folding fingers inwardly fold said end wall, mechanism for gumming and creasing portions of the partially folded bag top walls, and means for inwardly folding the partially folded side walls of the bag top, one over the other to seal the bag.

7. In a bag closing and sealing machine, a member mounted for continuous rotation and having a plurality of compartments therein each adapted to receive a filled bag, folding fingers mounted to engage an end wall of the open bag top and fold it inwardly over the bag body, said fingers subsequently outwardly spreading other portions of the bag top walls, means adapted to enter the mouth of the bag and outwardly spread or guide opposite walls thereof during the initial folding of said end wall, whereby the bag top walls may be accurately folded, a support for supporting said guide means over the path of travel of the bags and whereby said guide means are movable with the travel of the bags, while operating upon the walls thereof and means for gumming the bag top walls before they are folded into closing relation.

8. In a bag closing and sealing machine, a rotatable member having a plurality of compartments therein each adapted to receive a filled bag, folding fingers mounted to engage an end wall of the open bag top and fold it inwardly over the bag body, said fingers subsequently outwardly spreading other portions of the bag top walls beyond the bag body, means operating in timed relation to said folding fingers and adapted to enter the mouth of the bag and outwardly guide opposite walls thereof during the initial folding of the bag top walls, whereby the bag top walls may be accurately folded, means for gumming portions of the outwardly extending bag top walls before they are folded into closing relation, and means for inwardly folding said outwardly extending wall portions over the bag body.

9. In a bag closing and sealing machine, a member mounted for continuous rotation and having a plurality of compartments therein, each adapted to receive a filled bag, folding fingers adapted to engage the rear wall of the open bag mouth and fold it inwardly over the bag body, spreading fingers operatively connected with said folding fingers and movable with the travel of each bag and adapted to enter the open mouth of the bag and outwardly guide the side walls thereof, when the rear wall of the bag top is initially inwardly folded by said folding fingers, said folding fingers also being adapted to outwardly spread the partially folded side walls of the bag top beyond the sides of the bag body, means for compressing said outwardly extended wall portions, means for gumming portions of the bag top walls during the folding operation, and means for folding said extended wall portions against the bag body to seal the bag.

10. In a bag closing and sealing machine, a movable member having a plurality of compartments therein each adapted to receive a filled bag, folding fingers mounted to engage a wall of the open bag top and fold it inwardly over the bag body and subsequently outwardly spreading other portions of the bag top walls beyond the sides of the bag body, means for supporting said outwardly extended wall portions, rotatable creasing members adapted to engage said outwardly extended wall portions and compress them against said supporting means, means for simultaneously engaging and gumming said compressed wall portions, and means for squaring the upper portion of the bag body.

11. In a bag closing and sealing machine, a movable member having a plurality of compartments therein each adapted to receive a filled bag, means mounted to engage a wall of the open bag top and fold it inwardly over the bag body and subsequently outwardly spreading other portions of the bag top walls beyond the sides of the bag body, means for supporting said outwardly extended wall portions, a plurality of arcuately formed, yieldably mounted creasing members adapted to engage said outwardly extended wall portions and compress them against said supporting means, said creasing members having apertures therein, gumming elements in said apertures adapted to engage and gum the upper surfaces of said extended wall portions, gum applying means, means for preventing the creasing members from contacting with said gum applying means and means for folding said extended wall portions into closing relation.

12. In a bag closing and sealing machine, a movable member having means therein each adapted to receive a filled bag, folding fingers mounted to engage a wall of the open bag top and fold it inwardly over the bag body, means for operating said fingers and causing them to subsequently outwardly spread other portions of the bag top walls beyond the sides of the bag body, means for supporting said outwardly extended wall portions, a pair of yieldable creasing members adapted to engage said outwardly extended wall portions and compress them against said supporting means, means directly associated with said creasing members for gumming upper surfaces of said extended wall portions, and means for folding said extended wall portions inwardly over the bag body into closing relation.

13. In a bag closing and sealing machine, a rotor having a plurality of compartments therein each adapted to receive a bag to be sealed, a member situated adjacent to the line of travel of said compartments, means for feeding the filled, unsealed bags onto said member, certain of the walls of said compartments being mounted for pivotal movement on said rotor, and means for relatively moving said pivoted walls on the rotor, as they pass said member, whereby the filled bags are delivered into said compartments in upright positions, to thereby prevent displacement of the material therein.

14. In a bag closing and sealing machine, a rotor having a plurality of compartments therein, each adapted to receive a bag to be sealed, a member situated adjacent to the line of travel of said compartments, means for feeding the filled, unsealed bags onto said member, the front and bottom walls of said compartments being mounted for pivotal movement on said rotor, and means for relatively moving said pivoted walls on the rotor, whereby the bottom wall of each compartment, as it passes said member will be substantially alined therewith, to thereby prevent displacement of the material in the bags.

15. In a bag closing and sealing machine, a rotatable member having a plurality of compartments therein each adapted to receive a bag to be sealed, a horizontally disposed plate member situated adjacent to the line of travel of said compartments, a conveyer for delivering unsealed bags onto said plate member, certain of the walls of said compartments being mounted for pivotal movement whereby the bottom wall of each compartment is substantially horizontally alined with said plate member as it passes thereby, whereby a bag may be fed onto each bottom wall in a vertical position to thereby prevent displacement of the material in the bags, before they are sealed, and means for folding the bag top walls into closing relation.

16. In a bag closing and sealing machine, a member mounted for rotary movement and having a plurality of compartments therein, each adapted to receive a bag to be sealed, a plate situated adjacent to the line of travel of said compartments, means for feeding unsealed bags onto said plate, certain of the walls of said compartments being mounted for pivotal movement on the rotor, and cam means for actuating said pivoted walls to cause the bottom wall of each compartment to be substantially horizontally alined with said plate, when it passes thereby, whereby the unsealed bags may be fed from said plate onto the bottom walls of said compartments in upright positions, to thereby prevent displacement of the material in the bags before they are sealed.

17. In a bag closing and sealing machine including a shaft having a rotor mounted thereon and comprising a substantially circular member, a plurality of walls pivotally mounted on said member and cooperating therewith to define the walls of a plurality of compartments, a plurality of pivoted members mounted on said shaft and each forming a side wall of one of said compartments, said rotatable member having a plurality of inclined faces adjacent to its periphery substantially alined with said pivoted side wall members, a station at which the unsealed bags are fed into said compartments as the latter pass uninterruptedly thereby, means for actuating the bottom wall members of said compartments, whereby said bottom walls will be substantially horizontally disposed as they pass said station and whereby the unsealed bags are fed into said compartments in upright positions, and means for actuating said pivoted side wall members, whereby they will cooperate with the beveled faces on said rotatable member to compress or square the upper portions of the bag bodies at the level of the material therein, to facilitate folding the bag top walls into sealing relation.

18. In a bag closing and sealing machine, a member mounted for rotary movement and having a plurality of compartments therein each adapted to receive a bag to be filled, a plate situated adjacent to the line of travel of said compartments and comprising a plurality of threaded studs supported in suitable guides in the machine frame, adjusting members received in threaded engagement with said studs for vertically adjusting them in their respective guides, and means interconnecting said adjusting members whereby all of said studs may be adjusted simultaneously, to raise or lower said plate with respect to the bottom wall of each compartment as the latter pass thereby.

19. In a bag closing and sealing machine, a rotor having a plurality of compartments therein each adapted to receive a bag to be sealed, a mechanism for feeding the unsealed bags into said compartments comprising a horizontally disposed plate, a conveyer for feeding the bags onto said plate, a plurality of threaded studs secured to said plate and received in suitable guides, members received in threaded engagement with said studs and having a chain operatively connecting them together for simultaneous operation, whereby when the chain is operated, all of said members will be operated to vertically adjust the studs in their guides to thereby relatively adjust the position of said plate with respect to the bottom walls of the compartments of said rotor, as the latter pass thereby, and means for automatically feeding an unsealed bag into each compartment in an upright position, to thereby prevent displacement of the material in the bags before the tops thereof are closed.

20. In a machine for closing and sealing the open tops of filled paper bags, a member mounted for continuous rotation and having a plurality of compartments, each adapted to receive a filled, unsealed bag, mechanisms for gumming and folding the walls of the bag tops into closing relation, means for squaring the upper portions of the bag bodies at the level of the material therein to facilitate folding the bag top walls, and means for feeding an open unsealed bag into each compartment, said feeding means comprising a conveyer and means for transversely ejecting the bags therefrom to a position whereby they may be fed into said compartments.

21. In a machine for closing and sealing the open tops of filled paper bags, a member mounted for continuous rotation and having a plurality of compartments, each adapted to receive a filled, unsealed bag, mechanisms for gumming and folding the walls of the bag tops into closing relation, means for squaring only the upper portions of the bag bodies at the level of the material therein to facilitate folding the bag top walls, and means for feeding an open unsealed bag into each compartment without interrupting traveling movement of said member.

22. In a machine for closing and sealing the open tops of filled paper bags, a member mounted for continuous rotation and having a plurality of compartments, each adapted to receive a filled, unsealed bag, means for folding the walls of the bag tops into closing relation, means insertable in the open mouth of each bag and movable with the travel of the bag and adapted to outwardly spread opposite walls of the bag top whereby said walls will be symmetrically folded, means for squaring the upper portions of the bag bodies, and means for feeding an open unsealed bag into each compartment.

23. In a machine for closing and sealing the open tops of filled paper bags, a member mounted for continuous rotation and having a plurality of compartments, each adapted to receive a filled, unsealed bag, a mechanism mounted for traveling movement with the bags and adapted to engage walls of the open bag tops and fold them into closing relation, said mechanism including means insertable in the open mouth of each bag to outwardly guide opposite wall portions thereof, whereby said walls are symmetrically folded, and mechanism for gumming the bag top walls to secure them in sealing relation.

24. In a machine for closing and sealing the open tops of filled paper bags, a member mounted for continuous rotation and having a plurality of compartments, each adapted to receive a filled, unsealed bag, a mechanism mounted for traveling movement with the bags and adapted to engage the walls of the open bag tops and fold them into closing relation, said mechanism including means insertable in the open mouth of each bag and mounted for traveling movement therewith and adapted to outwardly guide opposite walls of each bag mouth while other portions thereof are folded inwardly over the bag body, whereby said walls are symmetrically folded, and means for securing the bag top walls in sealing relation.

25. In a machine for closing and sealing the open tops of paper bags, a member mounted for continuous rotary movement and having a plurality of compartments, each adapted to receive a bag to be sealed, a mechanism for feeding a bag into each compartment, including a substantially horizontally disposed plate member situated adjacent to the line of travel of said compartments, means pivotally supporting the bottom wall of each compartment, and means for alining each bottom wall with said plate member, as it passes thereby, whereby a bag may be fed onto each bottom wall in a vertical position, to thereby prevent displacement of the material in the bags before they are sealed.

26. In a machine for closing and sealing the open tops of filled paper bags, a member mounted for continuous rotary movement and having a plurality of compartments, each adapted to receive a bag to be sealed, a feeding mechanism including a substantially horizontally disposed plate member situated adjacent to the line of travel of said compartments, means pivotally supporting the bottom wall of each compartment, and means for relatively actuating said wall to aline it with said horizontally disposed plate member, as it passes thereby, whereby a bag may be fed onto each bottom wall in an upright position to thereby prevent displacement of the material therein, and means for folding the bag top walls into sealing engagement with one another.

27. In a machine for closing and sealing the open tops of filled paper bags, a member mounted for continuous rotation and having a plurality of compartments, each adapted to receive a filled, unsealed bag, means insertable in the open mouth of each bag for outwardly spreading opposite walls thereof to facilitate folding, means for folding the bag top walls into closing relation, and mechanism for gumming the folded bag top walls to secure them in sealing relation.

28. In a bag closing and sealing machine, a member mounted for rotary movement and having a plurality of compartments each adapted to receive a bag to be filled, a plate situated adjacent to the line of travel of said compartments, threaded means secured to said plate and adjustably supported in the machine frame, and means received in threaded engagement with said threaded means, and adapted for rotation thereon, whereby said plate member may be raised or lowered with respect to the bottom wall of each compartment to thereby suitably aline said plate therewith.

DANIEL BELCHER.